(12) United States Patent
Johnson

(10) Patent No.: US 8,568,034 B2
(45) Date of Patent: Oct. 29, 2013

(54) BUSHING KITS, BEARINGS, AND METHODS OF INSTALLATION

(75) Inventor: Timothy H. Johnson, Seattle, WA (US)

(73) Assignee: Fatigue Technology, Inc., Seattle, WA (US)

( * ) Notice: Subject to any disclaimer, the term of this patent is extended or adjusted under 35 U.S.C. 154(b) by 796 days.

(21) Appl. No.: 12/158,943

(22) PCT Filed: Jan. 11, 2007

(86) PCT No.: PCT/US2007/000931
§ 371 (c)(1),
(2), (4) Date: Apr. 1, 2009

(87) PCT Pub. No.: WO2007/082077
PCT Pub. Date: Jul. 19, 2007

(65) Prior Publication Data
US 2009/0304315 A1 Dec. 10, 2009

Related U.S. Application Data

(60) Provisional application No. 60/758,148, filed on Jan. 11, 2006.

(51) Int. Cl.
*F16C 33/02* (2006.01)
*B25B 27/00* (2006.01)
*B25B 27/14* (2006.01)

(52) U.S. Cl.
USPC ............... 384/276; 384/295; 29/270; 29/278

(58) Field of Classification Search
USPC ......... 384/192, 202, 203, 206, 208, 220, 221, 384/222, 276, 295, 297, 299, 296; 403/28, 403/29, 30, 365, 372; 29/252, 253, 255, 29/270, 271, 278
See application file for complete search history.

(56) References Cited

U.S. PATENT DOCUMENTS

| 295,593 A | 3/1884 | Thayer |
| 810,430 A | 1/1906 | Pfluger et al. |

(Continued)

FOREIGN PATENT DOCUMENTS

| DE | 2203217 | 7/1973 |
| DE | 33 01 849 C1 | 7/1984 |

(Continued)

OTHER PUBLICATIONS

Merriam Webster's Collegiate Dictionary, Tenth Edition, 1997, p. 154.

(Continued)

*Primary Examiner* — Thomas R Hannon
*Assistant Examiner* — Adam D Rogers
(74) *Attorney, Agent, or Firm* — Seed IP Law Group PLLC

(57) ABSTRACT

A bushing kit and a method of installing the same with a mandrel having a tapered region. The bushing kit includes an inner member and an outer bushing. The inner member may include an inner surface having an engagement portion, such as a coating, plating, and/or lining, such as a self-lubricating coating. The method of installing the bushing kit includes passing the tapered portion of the mandrel through the outer bushing to radially expand the outer bushing into the structural workpiece and possibly induce some amount of residual compressive stress in the structural workpiece. Contemporaneously, the inner member is passed into the radially-expanded outer bushing before the outer bushing is permitted to radially inwardly rebound or spring back. The outer bushing is then permitted to radially contract onto the inner member to form an interference fit therewith.

7 Claims, 10 Drawing Sheets

(56) References Cited

U.S. PATENT DOCUMENTS

| | | | |
|---|---|---|---|
| 1,081,496 A | 12/1913 | Gillmor | |
| 1,106,964 A | 8/1914 | Pahler | |
| 1,226,090 A | 5/1917 | Ludlum | |
| 1,297,142 A | 3/1919 | Gibbons | |
| 1,480,298 A | 1/1924 | Pearson | |
| 1,881,867 A | 10/1932 | Nelson | |
| 1,979,686 A | 11/1934 | Hall et al. | 85/40 |
| 2,092,358 A | 9/1937 | Robertson | 285/56 |
| 2,146,461 A | 2/1939 | Bettington | 218/29 |
| 2,150,361 A | 3/1939 | Chobert | 153/79 |
| 2,188,596 A | 1/1940 | Hobert | 16/2 |
| 2,275,451 A | 3/1942 | Maxwell | 29/157.5 |
| 2,282,711 A | 5/1942 | Eklund | |
| 2,357,123 A | 8/1944 | Maxwell | 153/80.5 |
| 2,385,294 A | 9/1945 | Lowy | 16/3 |
| 2,405,399 A | 8/1946 | Bugg et al. | 153/80 |
| 2,430,554 A | 11/1947 | Bugg et al. | 153/80 |
| 2,433,425 A | 12/1947 | Burckle | 285/84 |
| 2,468,985 A | 5/1949 | Krotz | 287/85 |
| 2,501,567 A | 3/1950 | Huck | |
| 2,528,180 A | 10/1950 | Roehl | 248/56 |
| 2,538,623 A | 1/1951 | Keating | |
| 2,583,719 A | 1/1952 | White | |
| 2,608,751 A * | 9/1952 | Hutton | 29/898.055 |
| 2,661,182 A | 12/1953 | Kipp | 251/76 |
| 2,672,175 A | 3/1954 | Howard | 153/80 |
| 2,695,446 A | 11/1954 | Meyer | 29/523 |
| 2,700,172 A | 1/1955 | Rohe | 16/2 |
| 2,808,643 A | 10/1957 | Weatherhead, Jr. | 29/508 |
| 2,887,003 A | 5/1959 | Brilmyer | |
| 2,943,667 A | 7/1960 | Ewing et al. | 153/80 |
| 3,107,572 A | 10/1963 | Orloff | |
| 3,128,999 A | 4/1964 | Schmitt | 267/1 |
| 3,129,630 A | 4/1964 | Wing et al. | |
| 3,137,887 A | 6/1964 | Mannino et al. | 16/2 |
| 3,149,860 A | 9/1964 | Hallesy | 285/18 |
| 3,164,054 A | 1/1965 | Biesecker | 85/8.8 |
| 3,222,977 A | 12/1965 | Vaughn | |
| 3,244,034 A | 4/1966 | Severdia | 77/62 |
| 3,252,493 A | 5/1966 | Smith | 151/41.7 |
| 3,262,353 A | 7/1966 | Waeltz et al. | |
| 3,290,770 A | 12/1966 | Silverman et al. | |
| 3,345,730 A | 10/1967 | Laverty | 29/243.52 |
| 3,358,492 A | 12/1967 | Richter | 72/393 |
| 3,377,907 A | 4/1968 | Hurd | |
| 3,399,435 A | 9/1968 | Ackerman | |
| 3,434,746 A | 3/1969 | Watts | 285/162 |
| 3,443,474 A | 5/1969 | Blakeley et al. | |
| 3,498,648 A | 3/1970 | Hallesy | 285/343 |
| 3,537,163 A | 11/1970 | Steidl | |
| 3,566,662 A | 3/1971 | Champoux | |
| 3,578,367 A | 5/1971 | Harvill et al. | |
| 3,596,948 A | 8/1971 | Spoehr | |
| 3,601,771 A | 8/1971 | Dozier | |
| 3,643,544 A | 2/1972 | Massa | |
| 3,657,956 A | 4/1972 | Bradley et al. | |
| 3,674,292 A | 7/1972 | Demler, Sr. | 285/174 |
| 3,677,684 A | 7/1972 | Platz | |
| 3,678,535 A | 7/1972 | Charles | |
| 3,693,247 A | 9/1972 | Brown | 29/512 |
| 3,695,324 A | 10/1972 | Gulistan | |
| 3,763,541 A | 10/1973 | Jaffe | 29/212 D |
| 3,765,078 A | 10/1973 | Gulistan | |
| 3,778,090 A | 12/1973 | Tobin | 285/222 |
| 3,787,945 A | 1/1974 | Pasek et al. | 29/157.4 |
| 3,820,297 A | 6/1974 | Hurd | 52/758 F |
| 3,835,525 A | 9/1974 | King, Jr. | 29/412 |
| 3,835,688 A | 9/1974 | King, Jr. | |
| 3,837,208 A | 9/1974 | Davis et al. | |
| 3,875,649 A | 4/1975 | King, Jr. | 29/418 |
| 3,878,760 A | 4/1975 | Jeal et al. | |
| 3,879,980 A | 4/1975 | King, Jr. | |
| 3,892,121 A | 7/1975 | Champoux et al. | |
| 3,895,409 A | 7/1975 | Kwatonowski | 16/2 |
| 3,915,052 A | 10/1975 | Ruhl | |
| 3,934,325 A | 1/1976 | Jaffe | 29/243.52 |
| 3,943,748 A | 3/1976 | King, Jr. | |
| 3,949,535 A | 4/1976 | King, Jr. | 52/758 D |
| 3,997,193 A | 12/1976 | Tsuda et al. | 285/47 |
| 4,003,288 A | 1/1977 | Jeal | |
| 4,044,591 A | 8/1977 | Powderley | |
| 4,089,247 A | 5/1978 | Dahl et al. | |
| 4,142,439 A | 3/1979 | Landt | |
| 4,143,580 A | 3/1979 | Luhm | 85/77 |
| 4,157,675 A | 6/1979 | King, Jr. | |
| 4,164,807 A | 8/1979 | King, Jr. | 29/523 |
| 4,168,650 A | 9/1979 | Dahl et al. | |
| 4,186,787 A | 2/1980 | Husain | |
| 4,187,708 A | 2/1980 | Champoux | |
| 4,230,017 A | 10/1980 | Angelosanto | |
| 4,237,768 A | 12/1980 | Volkmann | |
| 4,249,786 A | 2/1981 | Mahoff | 339/15 |
| 4,295,691 A | 10/1981 | Rubenthaler | |
| 4,355,612 A | 10/1982 | Luksch | 123/41.08 |
| 4,364,697 A | 12/1982 | Binns | |
| 4,370,081 A | 1/1983 | Briles | |
| 4,371,154 A | 2/1983 | Winbigler | |
| 4,386,515 A | 6/1983 | Starke | 72/391 |
| 4,397,061 A | 8/1983 | Kanzaka | 16/2 |
| 4,405,256 A | 9/1983 | King, Jr. | |
| 4,423,619 A | 1/1984 | Champoux | |
| 4,425,780 A | 1/1984 | Champoux | |
| 4,447,944 A | 5/1984 | Mohrman | 29/512 |
| 4,457,652 A | 7/1984 | Pratt | |
| 4,471,643 A | 9/1984 | Champoux et al. | |
| 4,482,089 A | 11/1984 | Lindahl et al. | 228/173 C |
| 4,491,358 A | 1/1985 | Choung | |
| 4,494,398 A | 1/1985 | Svoboda | |
| 4,522,378 A | 6/1985 | Nelson | 267/141.4 |
| 4,524,600 A | 6/1985 | Champoux et al. | |
| 4,530,527 A | 7/1985 | Holmberg | 285/382.4 |
| 4,557,033 A | 12/1985 | Champoux | |
| 4,557,650 A | 12/1985 | Molina | |
| 4,579,491 A | 4/1986 | Kull | |
| 4,583,388 A | 4/1986 | Hogenhout | 72/393 |
| 4,595,324 A | 6/1986 | Sadri | |
| 4,597,282 A | 7/1986 | Hogenhout | 72/370 |
| 4,609,315 A | 9/1986 | Briles | |
| 4,627,775 A | 12/1986 | Dixon | |
| 4,640,479 A | 2/1987 | Shely et al. | 248/56 |
| 4,659,271 A | 4/1987 | Pratt et al. | |
| 4,659,272 A | 4/1987 | Pratt | |
| 4,665,732 A | 5/1987 | Hogenhout | 72/393 |
| 4,678,384 A | 7/1987 | Sparling et al. | |
| 4,699,212 A | 10/1987 | Andersson et al. | 165/167 |
| 4,699,552 A | 10/1987 | Jeal | |
| 4,702,655 A | 10/1987 | Kendall | |
| 4,732,518 A | 3/1988 | Toosky | |
| 4,752,169 A | 6/1988 | Pratt | |
| 4,755,904 A | 7/1988 | Brick | 361/177 |
| 4,759,237 A | 7/1988 | Fauchet et al. | 81/53.2 |
| 4,787,793 A | 11/1988 | Harris | 411/339 |
| 4,809,420 A | 3/1989 | Landy et al. | |
| 4,832,548 A | 5/1989 | Strobel | |
| 4,869,091 A | 9/1989 | Shemeta | 72/393 |
| 4,872,332 A | 10/1989 | Potzas | |
| 4,877,363 A | 10/1989 | Williamson et al. | |
| 4,885,829 A | 12/1989 | Landy | |
| 4,900,205 A | 2/1990 | Sadri | |
| 4,905,766 A | 3/1990 | Dietz et al. | 169/91 |
| 4,934,038 A | 6/1990 | Caudill | 29/523 |
| 4,934,170 A | 6/1990 | Easterbrook et al. | |
| 4,950,115 A | 8/1990 | Sadri | |
| 4,967,463 A | 11/1990 | Pratt | |
| 4,985,979 A | 1/1991 | Speakman | 29/512 |
| 4,999,896 A | 3/1991 | Mangus et al. | 29/34 B |
| 5,025,128 A | 6/1991 | Derbyshire | |
| 5,038,596 A | 8/1991 | Noonan et al. | 72/391.4 |
| 5,066,179 A | 11/1991 | Pratt | |
| 5,069,586 A | 12/1991 | Casey | 411/339 |
| 5,083,363 A | 1/1992 | Ransom et al. | |
| 5,093,957 A | 3/1992 | Do | 16/2 |
| 5,096,349 A | 3/1992 | Landy et al. | |
| 5,103,548 A | 4/1992 | Reid et al. | |

(56) References Cited

U.S. PATENT DOCUMENTS

| | | | |
|---|---|---|---|
| 5,110,163 A | 5/1992 | Benson et al. | 285/382.2 |
| 5,123,792 A | 6/1992 | Strobel | |
| 5,127,254 A | 7/1992 | Copple et al. | |
| 5,129,253 A | 7/1992 | Austin et al. | 72/370 |
| 5,178,502 A | 1/1993 | Sadri | |
| 5,207,461 A | 5/1993 | Lasko | 285/222 |
| 5,213,460 A | 5/1993 | Sadri et al. | |
| 5,218,854 A | 6/1993 | Jarzebowicz et al. | 72/370 |
| 5,238,342 A | 8/1993 | Stencel | |
| 5,245,743 A | 9/1993 | Landy et al. | |
| 5,253,773 A | 10/1993 | Choma et al. | 230/86.2 |
| 5,256,017 A | 10/1993 | Smirnov et al. | |
| 5,305,627 A | 4/1994 | Quincey et al. | |
| 5,341,559 A | 8/1994 | Reid et al. | |
| 5,350,266 A | 9/1994 | Espey et al. | |
| 5,380,111 A | 1/1995 | Westrom | 402/74 |
| 5,380,136 A | 1/1995 | Copple et al. | |
| 5,390,808 A | 2/1995 | Choma et al. | 220/86.2 |
| 5,399,052 A | 3/1995 | Volkmann et al. | |
| 5,405,228 A | 4/1995 | Reid et al. | |
| 5,433,100 A | 7/1995 | Easterbrook et al. | |
| 5,466,016 A | 11/1995 | Briody et al. | 285/204 |
| 5,468,104 A | 11/1995 | Reid et al. | |
| 5,478,122 A | 12/1995 | Seabra | 285/281 |
| 5,496,140 A | 3/1996 | Gossmann et al. | |
| 5,498,110 A | 3/1996 | Stencel et al. | |
| 5,607,194 A | 3/1997 | Ridenour | 285/334.5 |
| 5,609,434 A | 3/1997 | Yehezkieli et al. | 403/260 |
| 5,632,582 A | 5/1997 | Gauron | |
| 5,634,751 A | 6/1997 | Stencel et al. | |
| 5,666,710 A | 9/1997 | Weber et al. | |
| 5,702,215 A | 12/1997 | Li | |
| 5,713,611 A | 2/1998 | Kurimoto et al. | 285/382.5 |
| 5,722,312 A | 3/1998 | Kristensen | 92/171.1 |
| 5,806,173 A | 9/1998 | Honma et al. | 29/727 |
| 5,813,808 A | 9/1998 | Wu | |
| 5,816,761 A | 10/1998 | Cassatt et al. | |
| 5,860,213 A | 1/1999 | Knudson | |
| 5,885,318 A | 3/1999 | Shimizu et al. | 65/493 |
| 5,943,898 A | 8/1999 | Kuo | 72/370.07 |
| 5,947,326 A | 9/1999 | O'Hern et al. | 220/802 |
| 5,947,667 A | 9/1999 | Cassatt et al. | |
| 6,036,418 A | 3/2000 | Stencel et al. | |
| 6,058,562 A | 5/2000 | Satou et al. | 16/2.1 |
| 6,077,009 A | 6/2000 | Hazelman | |
| 6,077,010 A | 6/2000 | Reid et al. | |
| 6,131,964 A | 10/2000 | Sareshwala | 285/382 |
| 6,183,180 B1 | 2/2001 | Copple et al. | |
| 6,217,082 B1 | 4/2001 | Orcutt et al. | 285/272 |
| 6,266,991 B1 | 7/2001 | Kuo | |
| 6,289,577 B1 | 9/2001 | Tanaka et al. | 29/603.03 |
| 6,325,582 B1 | 12/2001 | Sadri et al. | |
| 6,328,513 B1 | 12/2001 | Niwa et al. | 411/339 |
| 6,347,663 B1 | 2/2002 | Hunzinger et al. | 165/178 |
| 6,487,767 B1 | 12/2002 | Reid et al. | |
| 6,488,460 B1 | 12/2002 | Smith et al. | 411/353 |
| 6,499,926 B2 | 12/2002 | Keener | 411/504 |
| 6,537,005 B1 | 3/2003 | Denham | |
| 6,623,048 B2 | 9/2003 | Castel et al. | 285/382 |
| 6,651,301 B1 | 11/2003 | Liu | 29/243.521 |
| 6,705,149 B2 | 3/2004 | Cobzaru et al. | |
| 6,761,380 B2 | 7/2004 | Pachciarz et al. | 285/204 |
| 6,773,039 B2 | 8/2004 | Muenster et al. | 285/259 |
| 6,796,765 B2 | 9/2004 | Kosel et al. | 415/142 |
| 6,826,820 B2 | 12/2004 | Denham et al. | 29/524.1 |
| RE38,788 E | 9/2005 | Satou et al. | 16/2.1 |
| 6,990,722 B2 | 1/2006 | Reid et al. | |
| 7,024,908 B2 | 4/2006 | Poast et al. | |
| 7,024,909 B2 | 4/2006 | Cobzaru et al. | |
| 7,047,596 B2 | 5/2006 | Sucic et al. | 16/2.1 |
| 7,059,816 B2 | 6/2006 | Toosky | 411/181 |
| 7,100,264 B2 | 9/2006 | Skinner et al. | |
| 7,127,792 B2 | 10/2006 | Wakamori et al. | |
| 7,156,051 B2 | 1/2007 | Lorton et al. | |
| 7,273,338 B2 | 9/2007 | Summerlin | |
| 7,303,366 B2 | 12/2007 | Smith | |
| 7,325,796 B2 * | 2/2008 | Moreland | 267/293 |
| 7,375,277 B1 | 5/2008 | Skinner et al. | |
| 7,406,777 B2 | 8/2008 | Grover et al. | 33/645 |
| 7,448,652 B2 | 11/2008 | Poast et al. | |
| 7,509,829 B2 | 3/2009 | Johnson | |
| 7,575,404 B2 | 8/2009 | Toosky et al. | |
| 7,617,712 B2 | 11/2009 | Glenn | |
| 7,641,430 B2 | 1/2010 | Johnson et al. | |
| 7,695,226 B2 | 4/2010 | March et al. | |
| 7,926,318 B2 | 4/2011 | Glenn | |
| 7,926,319 B2 | 4/2011 | Johnson | |
| 8,069,699 B2 | 12/2011 | Glenn et al. | |
| 8,191,395 B2 | 6/2012 | Glenn | |
| 8,297,897 B2 | 10/2012 | Auriol et al. | |
| 8,312,606 B2 | 11/2012 | Reid et al. | |
| 8,322,015 B2 | 12/2012 | Pratt et al. | |
| 8,348,566 B2 | 1/2013 | Pratt | |
| 2003/0110618 A1 | 6/2003 | Magnuson | |
| 2004/0111864 A1 | 6/2004 | Skinner et al. | 29/523 |
| 2004/0213492 A1* | 10/2004 | Kim et al. | 384/300 |
| 2005/0000081 A1 | 1/2005 | Reid et al. | |
| 2005/0005669 A1 | 1/2005 | Poast et al. | |
| 2005/0025601 A1 | 2/2005 | Poast et al. | |
| 2005/0262682 A1 | 12/2005 | Grover et al. | |
| 2006/0045649 A1 | 3/2006 | Johnson et al. | |
| 2006/0251490 A1 | 11/2006 | Kleinman et al. | |
| 2007/0048107 A1 | 3/2007 | Johnson et al. | |
| 2007/0110541 A1 | 5/2007 | Rawlins et al. | 411/54.1 |
| 2007/0224016 A1 | 9/2007 | Toosky et al. | |
| 2007/0266756 A1 | 11/2007 | Shuster et al. | |
| 2007/0289351 A1 | 12/2007 | Glenn | 72/370.07 |
| 2008/0005887 A1 | 1/2008 | Glenn et al. | 29/523 |
| 2008/0034831 A1 | 2/2008 | Glenn | 72/370.07 |
| 2008/0066518 A1 | 3/2008 | Glenn et al. | 72/370.07 |
| 2008/0250603 A1 | 10/2008 | Skinner et al. | 16/2.2 |
| 2009/0304315 A1 | 12/2009 | Johnson | |
| 2010/0000280 A1 | 1/2010 | Reid et al. | |
| 2010/0260572 A1 | 10/2010 | Wehrmeister et al. | |
| 2011/0182689 A1 | 7/2011 | Avetisian | |

FOREIGN PATENT DOCUMENTS

| | | |
|---|---|---|
| DE | 3545554 A1 | 7/1987 |
| DE | 89 01 317 U1 | 3/1989 |
| EP | 0 054 592 A1 | 6/1982 |
| EP | 0 140 516 A1 | 5/1985 |
| EP | 0 248 122 A2 | 12/1987 |
| EP | 0 785 366 A1 | 7/1997 |
| EP | 0 891 007 A1 | 1/1999 |
| EP | 0 945 919 B1 | 9/1999 |
| EP | 1 166 951 A1 | 1/2002 |
| EP | 1 202 458 A1 | 5/2002 |
| EP | 1525952 A1 | 4/2005 |
| EP | 1611976 A1 | 1/2006 |
| EP | 1624202 A2 | 2/2006 |
| EP | 1 872 895 A2 | 1/2008 |
| EP | 1 903 221 A2 | 3/2008 |
| FR | 2645052 | 10/1990 |
| GB | 593607 | 10/1947 |
| GB | 1395009 | 5/1975 |
| GB | 2 239 917 A | 7/1991 |
| JP | 57137031 | 8/1982 |
| JP | 60238046 A | 11/1985 |
| JP | 61157846 | 7/1986 |
| JP | 09-072097 | 3/1997 |
| JP | 10-274366 | 10/1998 |
| JP | 10-299735 | 11/1998 |
| JP | 2001-177964 | 6/2001 |
| JP | 2004-176254 | 6/2004 |
| SU | 632463 | 11/1978 |
| WO | 8400120 A1 | 1/1984 |
| WO | 87/01418 | 3/1987 |
| WO | 91/11273 A1 | 8/1991 |
| WO | 00/28221 A2 | 5/2000 |
| WO | WO02059489 A1 | 8/2002 |
| WO | 2006132936 A1 | 12/2006 |

(56) References Cited

FOREIGN PATENT DOCUMENTS

| WO | 2007082077 A1 | 7/2007 |
| WO | 2007121932 A1 | 11/2007 |
| WO | 2010/009442 A2 | 1/2010 |

OTHER PUBLICATIONS

U.S. Appl. No. 09/603,857, filed Jun. 26, 2000, Skinner et al. (7,375,277).

* cited by examiner

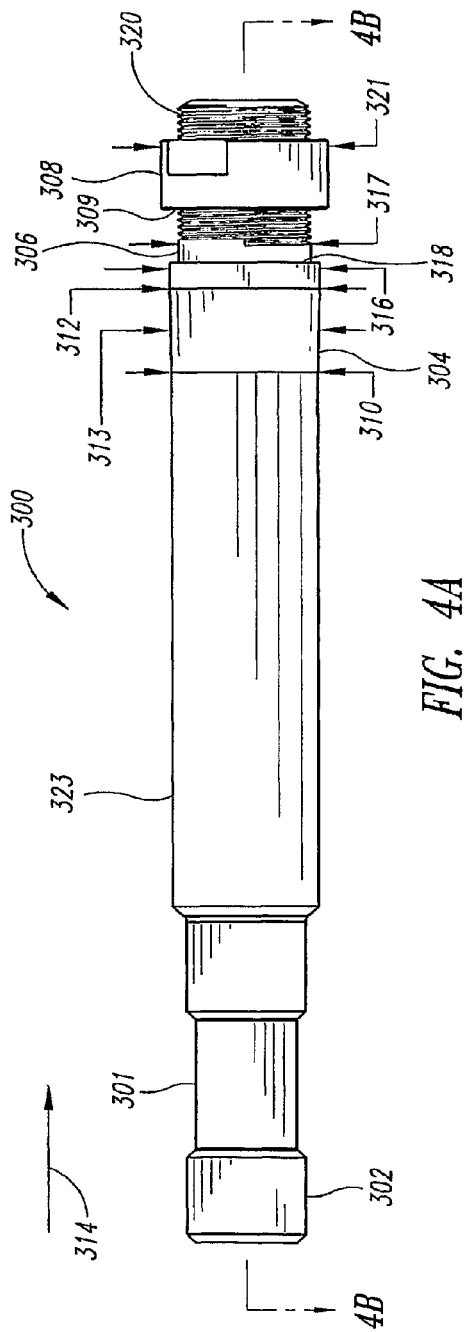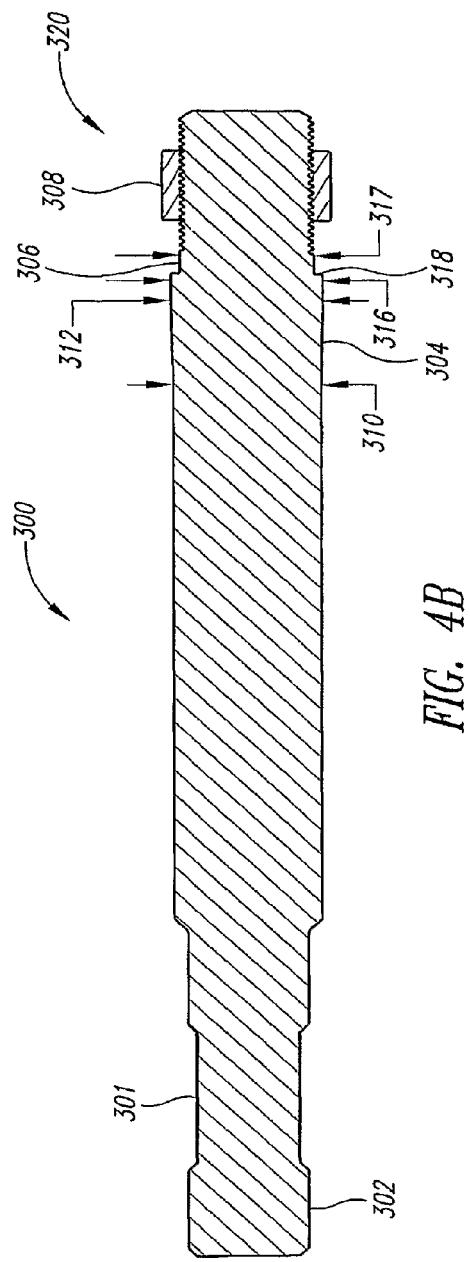
FIG. 4A
FIG. 4B

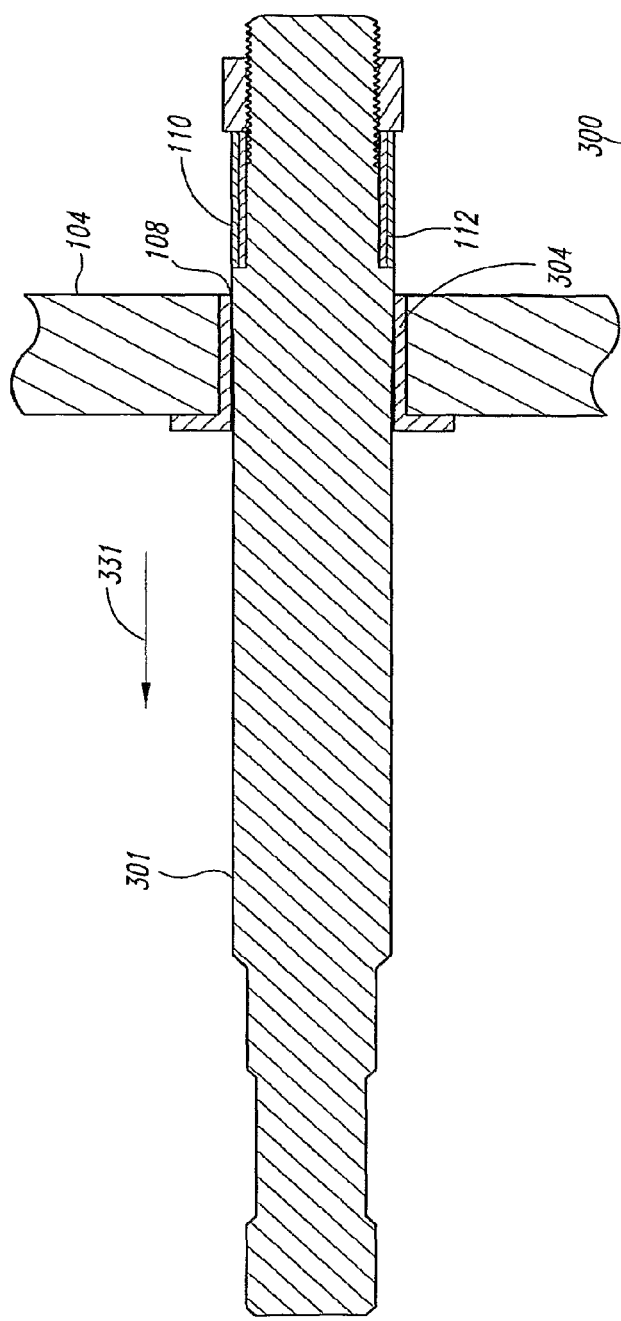
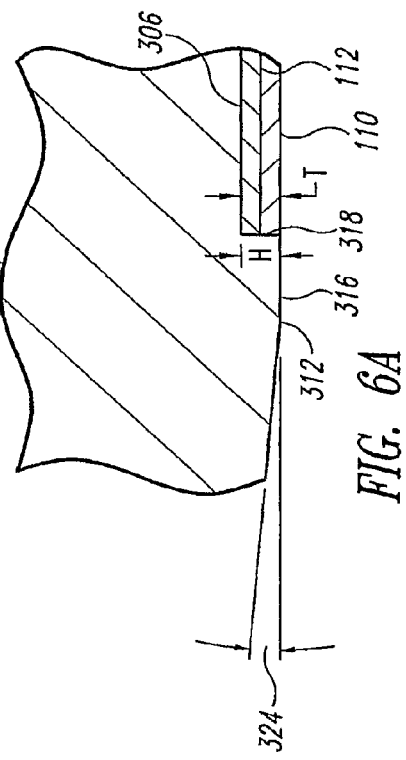
FIG. 5B
FIG. 6A

BUSHING KITS, BEARINGS, AND METHODS OF INSTALLATION

CROSS-REFERENCE TO RELATED APPLICATION

This application claims the benefit under 35 U.S.C. §119(e) of U.S. Provisional Patent Application No. 60/758,148 filed on Jan. 11, 2006, where this provisional application is incorporated herein by reference in its entirety.

BACKGROUND OF THE INVENTION

1. Field of the Invention

This disclosure generally relates to installable members and methods of installing the members in an opening of a workpiece.

2. Description of the Related Art

Conventional solid lubrication lined or coated bushings, bearings, or the like are utilized for a variety of applications and in a variety of industries. These bushings and/or bearings are generally referred to as "self-lubricating" bushings and/or bearings and are employed where lubricant cannot be supplied continuously or repeatedly. One type of self-lubricating bearing is a KARON® bearing manufactured by Kamatics Corporation, which is a subsidiary of Kaman Corporation. The KARON® bearing includes a machinable self-lubricating liner system that resists swelling.

Self-lubricating bushings and/or bearings are typically installed into an opening of a structural workpiece by either press fit techniques or conventional freeze (i.e., shrink) fit techniques. Both of these techniques permit the self-lubricating bushing and/or bearing to be installed without causing damage to the inner diameter surface, which may be a soft lubricated liner or may be silver-coated, for example.

The process of shrink fitting includes sufficiently cooling the bushing and/or bearing in cryogenic fluid to reduce the outer diameter and rapidly placing it into the structural workpiece. Alternatively, the process of press fitting is where the bushing and/or bearing has a slightly larger outer diameter than the diameter of the receiving opening, and the bushing and/or bearing is forced into the opening. One drawback of both of these processes is that they cause damage to structural material surrounding the opening. Another drawback is that the amount of interference fit is limited because of a number of factors. In shrink fitting, for example, the temperature may not be low enough to sufficiently shrink the outer diameter of the bushing or bearing or the installation may not be fast enough to place the bushing or bearing before the outer diameter returns to the normal size at ambient temperature (e.g., the operating temperature). In press fitting, the tolerances between the bushing and/or bearing and the opening in the structural workpiece will vary, which may result in at least some assemblies not achieving a desired amount of interference. In addition, press fitting is typically limited to being used on smaller assemblies; otherwise the pressing forces exceed the capabilities of even large mechanical presses. These drawbacks, in turn, may lead to manufacturing difficulties, increased manufacturing costs, in-service problems, and/or degraded operational performance of the components that were fit together.

One option for installing bushings and/or bearings, especially in components that will undergo repetitive load cycles and/or may be susceptible to accumulating fatigue damage, is the FORCEMATE® installation method developed by Fatigue Technology, Inc. The FORCEMATE® installation method utilizes a tapered mandrel installed in a puller tool, for example, to pass the mandrel through an initially clearance fit bushing that has been positioned in the opening of the structural workpiece. The tapered mandrel radially expands the bushing into the opening to obtain a controlled and consistently higher interference fit than would be achievable by either the shrink or press fit processes. In addition, the FORCEMATE® installation method induces beneficial residual compressive stresses into the structural material surrounding the opening, which may advantageously extend the fatigue life of the component, assembly, or installation. The FORCEMATE® installation method, as well as other cold-working methods; tooling, and the like, such as the BUSH-LOC®, FORCETEC®, and FLEXMATE® methods are described in U.S. Pat. Nos. 3,566,662; 3,892,121; 4,187,708; 4,423,619; 4,425,780; 4,471,643; 4,524,600; 4,557,033; 4,809,420; 4,885,829; 4,934,170; 5,083,363; 5,096,349; 5,405,228; 5,245,743; 5,103,548; 5,127,254; 5,305,627; 5,341,559; 5,380,136; 5,433,100; and in U.S. patent application Ser. Nos. 09/603,857; 10/726,809; 10/619,226; and 10/633,294.

The FORCEMATE® and other installation methods identified in the preceding paragraph have been found to be less than optimal for installing self-lubricated bushings and/or bearings because the operation of passing (e.g., pushing or pulling) the mandrel through the bushing and/or bearing may damage the lubricated liner and/or coating. To limit such damage, the amount of radial expansion must be reduced, however this results in less than optimum fatigue life enhancement of the surrounding structure and less than optimum fixity between the bushing or bearing and the structure.

Based on the foregoing, it is desirable to have an installable component (e.g., a bushing, fitting, fastener, bearing, and the like), an assembly, or a kit, as well as method of installing the same. Benefits of cold expansion of the structural workpiece can be achieved while minimizing, reducing, limiting, or substantially preventing damage the self-lubricated component, bearing, or like device.

SUMMARY OF THE INVENTION

At least one embodiment generally relates to a bushing kit and method of installing the same with a mandrel having a tapered region. The bushing kit comprises an inner and an outer bushing. The inner bushing may include an inner surface having a specialized coating, plating, and/or lining, such as a self-lubricating coating. The method of installing the bushing kit includes passing the tapered portion of the mandrel through the outer bushing to radially expand the outer bushing into the structural workpiece and possibly induce some amount of residual compressive stress in the structural workpiece. Contemporaneously, the inner bushing is pulled into the radially expanded outer bushing such that as the outer bushing radially rebounds or springs back, a tight interference fit is achieved between the inner and outer bushings. Further, the positioning of the inner bushing on the mandrel and the insertion of the inner bushing into the outer bushing may be accomplished without altering the integrity of the specialized coating, plating, and/or lining on the inner surface of the inner bushing. In one embodiment, the bushing kit and installation method may be used to achieve a rapid, consistent and controlled interference fit of lubricant-lined metal bushings/bearings into either metallic or composite structural workpieces.

In some embodiments, an assembly kit installable into an opening in a workpiece comprises an outer bushing having an inner surface and an outer surface, the inner surface having an inner perimeter, the outer surface having an outer perimeter sized to closely fit within the opening of the workpiece, the outer bushing radially expandable into the opening of the workpiece; and an inner member having an outer surface with an outer perimeter sized to form a clearance fit with the inner perimeter of the radially expanded outer bushing and further sized to form an interference fit with the inner perimeter of the outer bushing after the outer bushing has at least partially radially contracted onto the inner member when the outer bushing and the inner member are at substantially the same temperature.

In some embodiments, a bushing installation comprises a workpiece having an opening; an outer member in a first expanded configuration being positioned in the opening, the outer member having an inner surface and an outer surface, the inner surface having an inner perimeter and defining a passageway, the outer surface having an outer perimeter forming an interference fit with the workpiece because of a sufficient outward displacement of the outer member from an initial configuration to a second expanded configuration; and an inner member positioned in the passageway of the outer member, the inner member having an outer surface forming an interference fit with the inner surface of the outer member because of a sufficient inward displacement of the outer member from the second expanded configuration to the first expanded configuration.

In some embodiments, a mandrel coupleable to an installation tool to install an outer bushing and an inner member of a bushing kit into an opening in a structural workpiece, the mandrel comprises an engagement portion sized and shaped to cooperatively engage a portion of the installation tool; a tapered region coupled to the engagement portion for movement therewith, the tapered region having a minimum perimeter portion and a maximum perimeter portion, the tapered region configured to engage and radially expand the outer bushing as the tapered region passes therethrough and thereby provide an interference fit of the outer bushing with at least a portion of the structural workpiece; and a receiving portion coupled to the tapered region and proximate the maximum perimeter portion thereof, the receiving portion having an outer perimeter sized to receive the inner member that forms an interference fit with the outer bushing expanded with the tapered region and sized to be smaller than the maximum perimeter portion of the tapered region.

In some embodiments, an installation system for installing an outer bushing and an inner member of a bushing kit into an opening in a structural workpiece, the installation system comprises a mandrel comprising an engagement portion configured to be received by an installation tool for moving the mandrel; a tapered region coupled to the engagement portion, the tapered region having a minimum perimeter portion and a maximum perimeter portion, the tapered region operable to radially expandingly urge the outer bushing into the structural workpiece as the maximum perimeter portion of the mandrel passes through the outer bushing; and a receiving portion positioned proximate the maximum perimeter portion of the tapered region, the receiving portion coupled to the tapered region to move the inner member into the outer bushing after the outer bushing has been radially expanded by the maximum perimeter portion such that the outer bushing contracts to form an interference fit with the inner bushing.

In some yet other embodiments, a method of installing an outer bushing and an inner member into an opening in a structural workpiece, the method comprises moving a first portion of a mandrel through the outer bushing, the mandrel comprising the first portion, a tapered region, and a receiving surface, the inner member positioned on the receiving surface; moving the tapered region of the mandrel through the outer bushing to successively radially expand the outer bushing into the structural workpiece, the tapered region extending from a minimum perimeter portion to a maximum perimeter portion; moving the inner member into the radially-expanded outer bushing, the inner member having an outer perimeter that is not greater than the maximum perimeter portion of the mandrel when the inner member is positioned on the receiving surface of the mandrel; and allowing at least a portion of the radially-expanded outer bushing to radially contract onto the inner member to form an interference with the inner member.

In yet other embodiments, a method of installing an articulatable bearing into an opening in a structural workpiece, the method comprises positioning a mandrel carrying the bearing through the opening, the mandrel comprising a tool section configured to engage an installation tool, a tapered section, and a receiving section holding the bearing; moving the tapered section of the mandrel through the opening to radially expand the opening of the structural workpiece so as to induce compressive residual stresses in the workpiece; moving the bearing into the radially-expanded opening with the mandrel; and allowing at least a portion of the radially-expanded opening to contract inwardly to couple the bearing to the workpiece.

In one aspect, an assembly kit installable into an opening in a workpiece includes an outer bushing having an inner surface and an outer surface, the inner surface having an inner perimeter, the outer surface having an outer perimeter sized to closely fit within the opening of the workpiece, the outer bushing radially expandable into the opening of the workpiece; and an inner member having an outer surface with an outer perimeter sized to form a clearance fit with the inner perimeter of the radially expanded outer bushing and further sized to form an interference fit with the inner perimeter of the outer bushing after the outer bushing has at least partially radially contracted onto the inner member, wherein the outer bushing and the inner member are at substantially the same temperature when assembled.

In another aspect, a mandrel coupleable to an installation tool to install an outer bushing and an inner member of a bushing kit into an opening in a structural workpiece includes a tapered region comprising a minimum perimeter portion extending to a maximum perimeter portion, the tapered region positioned proximate the engagement portion, the tapered region operable to radially expandingly urge the outer bushing into the structural workpiece as the maximum perimeter portion of the mandrel passes through the outer bushing; a receiving surface positioned proximate from the tapered region, the receiving surface having an outer perimeter sized to receive the inner member, the outer perimeter of the receiving surface sized to be smaller than the maximum perimeter portion of the tapered region; and a collar positioned downstream from the receiving surface, the collar engageable with the mandrel to contact the inner member.

In yet another aspect, a method of installing an outer bushing and an inner member into an opening in a structural workpiece includes moving a first portion of a mandrel through the outer bushing, the mandrel comprising the first portion, a tapered region, and a receiving surface, the inner member positioned on the receiving surface; moving the tapered region of the mandrel through the outer bushing, the tapered region having a minimum perimeter portion extending to a maximum perimeter portion, the tapered region successively radially expanding the outer bushing into the structural workpiece; moving the inner member into the radially-expanded outer bushing, the inner member having an outer perimeter that is not greater than the maximum perimeter portion of the mandrel when the inner busing is positioned on the receiving surface of the mandrel; and allowing at least a portion of the radially-expanded outer bushing to radially contract onto the inner member to form an interference with the inner member.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 4A is a side elevational view of a mandrel assembly for installing a bushing kit into an opening of a structural workpiece, according to one illustrated embodiment.

FIG. 4B is a cross-sectional view of the mandrel assembly of FIG. 4A taken along line 4B-4B.

FIG. 5B is a cross-sectional view of the mandrel of FIG. 4A showing the inner member about to be passed into the radially expanded outer bushing.

FIGS. 6A-6E are detailed views of one region of the mandrel of FIG. 5A where the inner bushing and the tapered region of the mandrel are arranged.

DETAILED DESCRIPTION OF THE EMBODIMENTS

Figure 1:
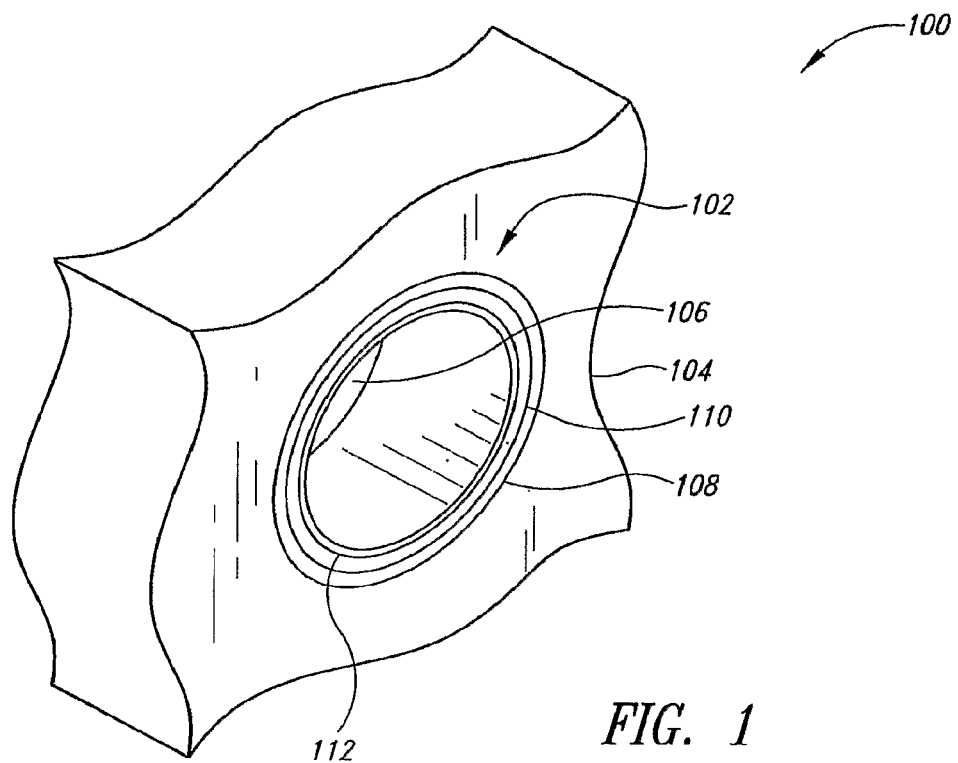
FIG. 1 is an isometric view of an installation comprising a structural workpiece with a bushing kit installed therein, according to one illustrated embodiment.

In the following description, certain specific details are set forth in order to provide a thorough understanding of various embodiments. However, one skilled in the art will understand that the embodiments may be practiced without these details. In other instances, well-known structures and methods associated with cold working and/or installing a component (e.g., a bushing or a bearing) into an opening in a structural workpiece may not be shown or described in detail to avoid unnecessarily obscuring descriptions of the embodiments. It is appreciated and understood that the process of installing the component into the opening of the structural workpiece may or may not result in the creation of an annular zone of residual compressive stress in the structural workpiece or workpieces.

In the following description and for purposes of brevity, reference shall be made to cold working and/or radial expanding of the structural workpiece. This reference is not intended to limit or otherwise narrow the scope of the disclosed embodiments. The process of cold expansion is to be broadly interpreted as any process that radially expands at least some of the material surrounding the opening in the structural workpiece, even if the expansion is for the purpose of impeding the growth of a fatigue crack. It is further understood that cold expanding the opening of the structural workpiece may or may not induce beneficial compressive residual stresses and may or may not produce fatigue-enhancing benefits in the structural workpiece.

Unless the context requires otherwise, throughout the specification and claims which follow, the word "comprise" and variations thereof, such as "comprises" and "comprising," are to be construed in an open, inclusive sense, that is as "including, but not limited to."

The headings provided herein are for convenience only and do not interpret the scope or meaning of the claimed invention.

As used in this specification and the appended claims, the singular forms "a," "an," and "the" include plural referents unless the content clearly dictates otherwise. Thus, for example, reference to a bushing that includes "a flange" includes a bushing with a single flange or a bushing with two or more flange, or both. It should also be noted that the term "or" is generally employed in its sense including "and/or" unless the context clearly dictates otherwise.

The following description relates to a bushing kit and a method of installing the bushing kit into the structural workpiece. The bushing kit may include one or more installable components. The bushing kit in some embodiments includes an inner member and an outer bushing. The inner member may include an engagement portion that defines at least a portion of a surface for contacting another component. The engagement portion can be a coating, plating, lining, or other suitable feature that remains substantially unaltered during the installation process. In some embodiments, the engagement portion comprises a lubricant or other material with a material hardness that is less than the material hardness of another portion of the inner member, using the same material hardness test. The engagement portion can be configured to minimize, reduce, limit, or substantially prevent corrosion, fretting, and other forms of wear. For example, the engagement portion can comprise a high wear material (e.g., a lubricant) that reduces frictional forces to improve service performance. In some embodiments, the inner member is a movable or articulatable bearing, such as a spherical bearing. The inner member may be installed in a multi-step process to ensure proper functioning of the installed bearing.

Installing the bushing kit according to at least one embodiment may advantageously achieve a desired amount of cold expansion of the structural workpiece while contemporaneously achieving an interference fit to secure the inner member with the outer bushing. Further, the integrity of the outer bushing and inner member can be maintained during the installation process. In addition, the amount of interference in the installed assembly (e.g., interference between the inner member and the outer bushing or the interference between the outer bushing, or both) can be accurately controlled. The assembly can be configured to achieve a wide range of interferences suitable for various operating conditions.

These advantages, as well as other or additional advantages over conventional bushing kits and installation methods, will become apparent and be appreciated by those skilled in the art after reviewing the following detailed description, claims, and figures.

Bushing Kit(s)

FIG. 1 shows an installation 100 comprising a bushing kit 102 installed into a structural workpiece 104, according to one illustrated embodiment. The structural workpiece 104 includes an opening 106 extending at least partially through the thickness of the structural workpiece 104. The illustrated opening 106 is a through-hole extending between opposing outer surfaces of the workpiece 104

The term "bushing kit" as used herein generally refers, without limitation, to an outer member and an inner member that are installed into the opening in the structural workpiece. The bushing kit 102 of FIG. 1, for example, includes an outer member 108 in the form of a bushing and an inner member 110. It is understood and appreciated that one or more of the components of the bushing kit may be elements other than bushings, such as, for example, fittings, fasteners, sleeves (including split sleeves), and the like. The components (e.g., the outer member 108) can comprise metal (e.g., steel, aluminum, bronze, and the like), non-metals, polymers, plastics (e.g., nylon, polyurethane, and the like), elastomers, rubbers, and other expandable materials. The inner member, for example, may be a bearing, a sleeve, a liner, a bushing, a fastener, or some other component or element that can be placed on a mandrel and pulled into a radially expanded outer member.

The outer bushing 108 can be expanded from a first configuration to a second configuration in order to form an interference fit with the workpiece 104. A cold expansion process can radially expand the outer bushing 108, without appreciably raising the temperature of the bushing 108 or workpiece 104, to cold work the workpiece 104 to induce residual stresses in the workpiece 104, thereby enhancing fatigue performance of the installation 100. The residual stresses are preferably compressive stresses that can minimize, limit, inhibit, or prevent crack initiation, crack propagation, and other failures or problems.

As used herein, the term "workpiece" is broadly construed to include, without limitation, a parent structure having at least one hole or opening (e.g., a circular opening, elliptical opening, polygonal opening, and the like) suitable for receiving at least one expandable member. In some embodiments, the bushing kit 102 can be installed in the structural workpiece 104 in the form of a bulkhead, lug, fuselage, engine or other structural member of an aircraft. The structural workpiece 104 can also be a rail, component of transportation vehicle (e.g., a train, automobile, helicopter, and the like), and other structural members that may experience static or cyclic loading. The structural workpiece 104 can comprise one or more metals (e.g., steel, aluminum, titanium, and the like), polymers, plastics, composites, and other materials suitable for engaging installable members.

Figure 2:
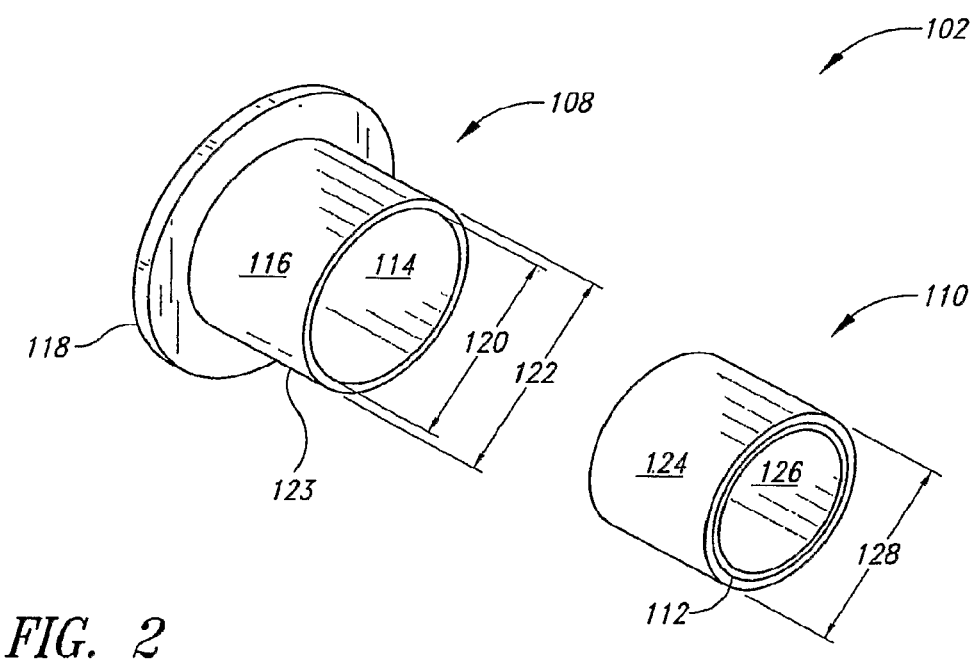
FIG. 2 is an isometric exploded view of a bushing kit comprising an inner bushing and an outer bushing, according to one illustrated embodiment.

FIG. 2 shows the outer bushing 108 and the inner member 110 of the bushing kit 102, according to one illustrated embodiment. The outer bushing 108 includes an inner surface 114 defining a passageway and an outer surface 116. Optionally, the outer bushing 108 may also include a radial flange 118. The inner surface 114 includes an inner perimeter 120. The outer surface 116 includes an outer perimeter 122 that is sized to closely fit (e.g., clearance fit with a minimal amount of clearance) within the opening 106 of the structural workpiece 104. The outer bushing 108 may be made from a wide variety of materials that permit the outer bushing 108 to be radially expanded in the opening 106 of the structural workpiece 104. The expanded outer bushing 108 can then radially contract (e.g., elastically contact) onto the inner member 110. The bushing 108 can experience plastic deformation to form a permanent interference fit with the workpiece 104 and elastic deformation to contract onto and form an interference fit with the inner member 110.

The outer bushing 108 can have a monolayer or multilayer main body 123, illustrated as a generally tubular body. For example, a layer of material can be applied to the inner surface or outer surface of the main body 123. The applied material can be a lubricant (e.g., solid lubricants, liquid lubricants, and the like), metal, sealant, or other suitable material for engaging the workpiece 104 or the inner member 110, as well as other components, if needed or desired. Similarly, the inner member 110 can have a monolayer or multilayer construction.

The inner member 110 includes an outer surface 124 and an inner surface 126. In one embodiment, the inner surface 126 comprises an engagement portion 112 configured to engage another component. The engagement portion 112 can be a layer (e.g., a coating or plating) of a wear resistant material, lubricant (e.g., an anti-fretting lubricant), or anti-fretting material that is applied to the inner member 110. The engagement portion 112 can reduce friction, for example friction between the inner member 110 and another component (not shown) that may move relative to the inner member 110.

One type of engagement portion 112 may be a silver coating applied for wear purposes that may include an amount of silver iodide to enhance the lubricity of the silver coating. Alternatively or additionally, the inner surface 126 can be formed of a polymer, such as synthetic resin lubricants like polytetrafluoroethylene (PTFE), TEFLON®, nylon, NEDOX® CR+, blends, mixtures, and combinations thereof. These materials can be generally referred to as "soft" because they are generally softer than the main bushing material (e.g., steel). Thus, these relatively soft engagement portions are generally more prone to being damaged during the installation process.

The outer surface 124 of the inner member 110 includes an outer perimeter 128 that is sized to be equal to (e.g., maximum tolerance conditions) or at least slightly smaller than the inner perimeter 120 of the "radially expanded" outer bushing 108. This relative sizing allows the inner member 110 to be passed (e.g., pulled, pushed, or both) into the outer bushing 108 such that the inner member 110 props open the outer bushing 108. In some embodiments, the inner member 110 can be inserted into the outer bushing 108 without damaging the inner surface 114 of the outer bushing 108. The relative sizing of the bushing 108 and inner member 110 can also permit the inner member 110 to be passed into the radially expanded outer bushing 108 so that the outer bushing 108 can contract (e.g., collapse, constrict, and the like) about the inner member 110. The bushing 108 can elastically contract to form an interference fit with the inner member 110, which both supports and limits the radial contraction of the outer bushing 108.

Figure 3:
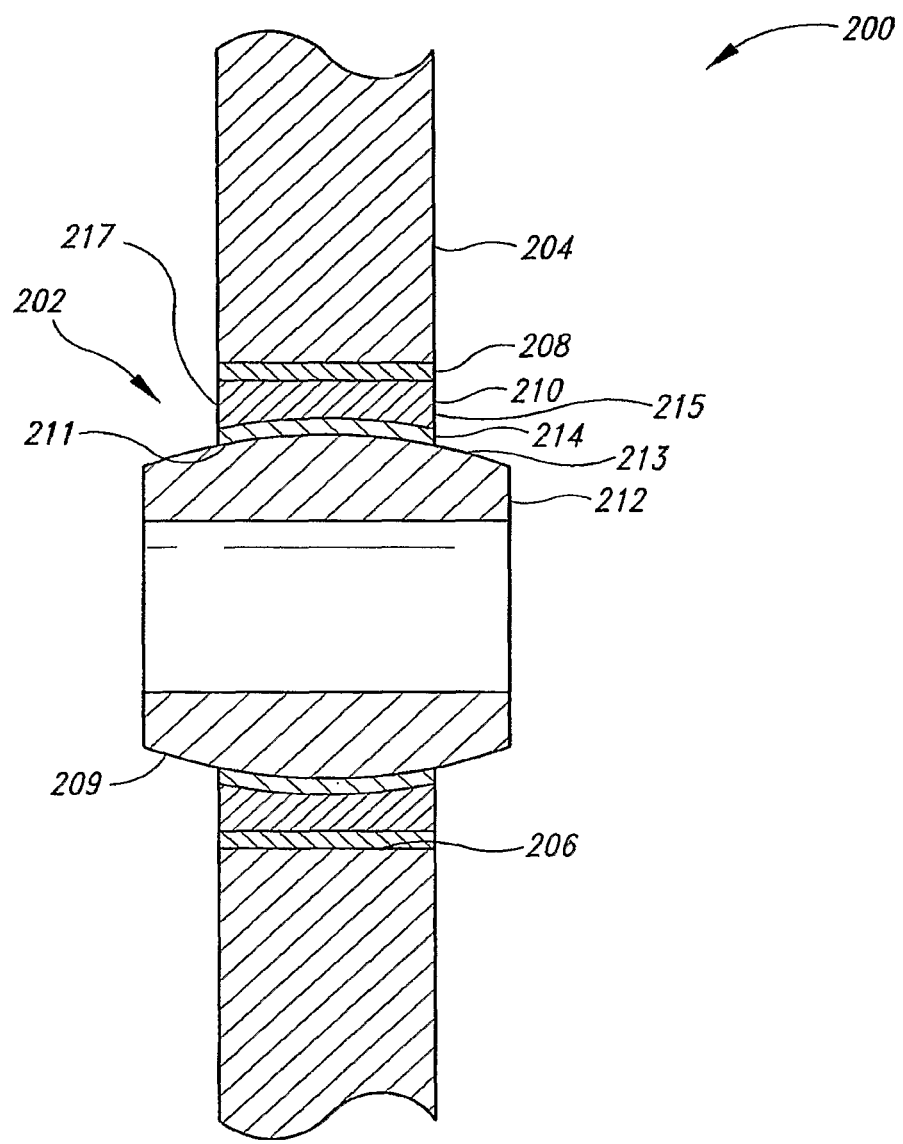
FIG. 3 is a cross-sectional view of a bushing kit comprising an outer bushing and a spherical bearing assembly, according to one illustrated embodiment.

FIG. 3 shows another installation 200 comprising a bushing kit 202 installed into a structural workpiece 204, according to one illustrated embodiment. The structural workpiece 204 includes an opening 206 extending at least partially through the thickness of the structural workpiece 204. The bushing kit 202 includes an outer bushing 208 and a bearing 209. The bearing 209 can be an assembled spherical bearing comprising a race 210 and a ball 212. The race 210 can have an inner surface 211 configured to closely surround at least a portion of the ball 212 movable with respect to the race 210.

The ball 212 can have a curved outer surface 213 complementary to the inner surface 211 of the race 210. The illustrated outer surface 213 is partially spherical in shape and is configured to conform closely to the inner surface 211 of the race 210.

Different installation processes can be used depending on whether the race 210 is a one-piece or multi-piece race. For example, a one-piece annular race 210 and the ball 212 can be pre-assembled and inserted together into the outer bushing 208. Interference in the installation 200 can reduce tolerances of the assembled bushing kit 202. A two-piece race may be installed into the outer bushing 208 before the ball 212 is placed into the race 212.

In two-piece split race embodiments, the two halves of the race mate to form a multi-piece annular race that engages the ball 212. Each of the outer faces 215, 217 may include a groove that forms a displaceable edge. Once the ball 212 is placed in the race 210, a tool (e.g., a stake) can be placed in the groove to stake the displaceable edge outwardly over the bushing 208, thereby locking the bushing kit 202 to the workpiece 204. The staked edge can rotationally and translationally fix the race 210 to the workpiece 204.

When the bushing kit 202 is installed, the interference can press the race 210 towards the ball 212. Clearance can be provided between the race 210 and the ball 212 to accommodate for these compressive forces. The clearance between the race 210 and ball 212, before assembly, can be large or small to accommodate high interference or low interference, for example.

An optional liner 214 may be positioned between the race 210 and the ball 212 to allow the spherical bearing to be self-lubricating. The liner 214 can comprise a lubricant to promote proper relative movement between the ball 212 and the race 210.

Tooling for Installing a Bushing Kit

Figure 6B:
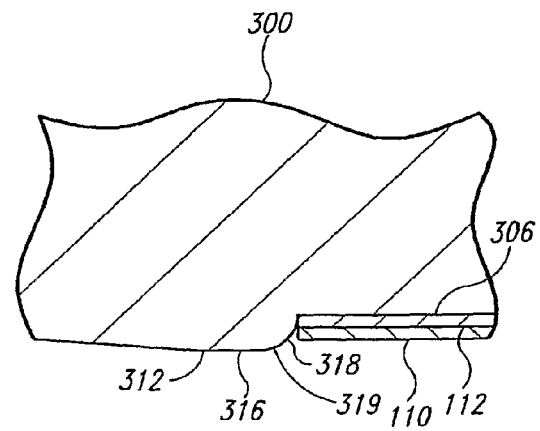

FIG. 4A shows a mandrel assembly 300 including a mandrel 301 having an engagement portion 302, a tapered region 304, a receiving surface 306, and a collar 308. The engagement portion 302 permits the mandrel 301 to be connected to an installation or puller tool. The tapered region 304 includes a minimum perimeter portion 310, a maximum perimeter portion 312, and a transition perimeter portion 313 extending therebetween. As shown in FIG. 6A, the tapered region 304 includes a taper angle 324. The tapered region 304 is positioned downstream, as indicated by the arrow 314, from the engagement portion 302 and operates to radially expand the outer bushing 108 of FIG. 1 into the opening 106 of the structural workpiece 104. Accordingly, the maximum perimeter portion 312 of the mandrel 301 is at least slightly larger than the inner perimeter 120 of the outer bushing 108.

A uniform perimeter region 316 with a perimeter generally equal to the maximum perimeter portion 312 may be positioned adjacent to the maximum perimeter portion 312 of the tapered region 304 of the mandrel 301. The uniform perimeter region 316 can be useful during the manufacturing of the mandrel assembly 301. In some embodiments, the mandrel 301 may not have a uniform perimeter region in order to reduce the axial length of the mandrel 301. The maximum perimeter portion 312, for example, can extend from the receiving section 306.

The receiving surface 306 is positioned near the tapered region 304 and includes an outer perimeter 317 sized to receive the inner member 110. The outer perimeter 317 can be sized to receive (e.g., loosely receive with a clearance fit) the inner member 110 so as to minimize, limit, or substantially prevent damage to the inner surface 126 of the inner member 110. When the inner member 110 is positioned along the receiving surface 306 (see FIG. 5A), the inner member 110 can be axially fixed with respect to the mandrel 301. The outer perimeter 317 can be sized to be smaller than the maximum perimeter portion 312 of the tapered region 304.

Referring again to FIG. 4A, a shoulder 318 can form the transition between the maximum perimeter portion 312 or the uniform perimeter region 316 and the receiving surface 306. The illustrated shoulder 318 is in the form of an annular step. Other shoulder configurations are also possible.

Figure 6C:
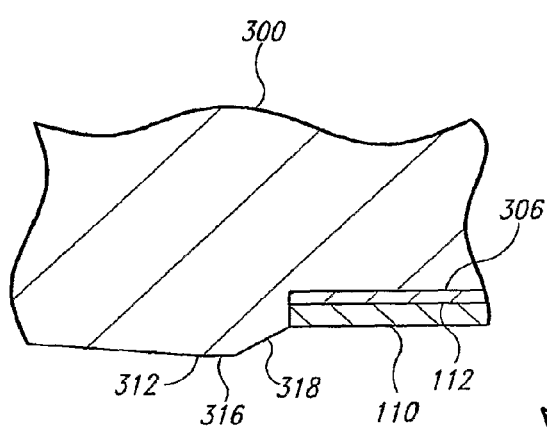
Figure 6D:
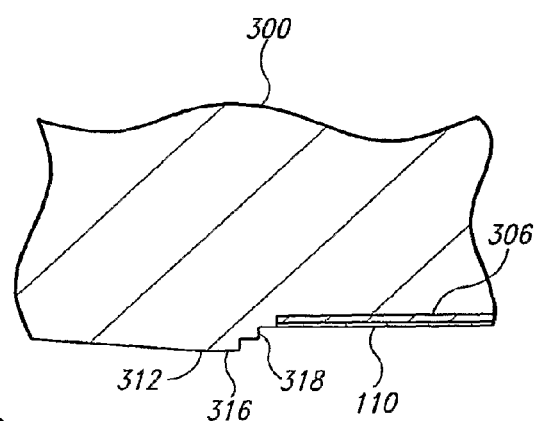
Figure 6E:
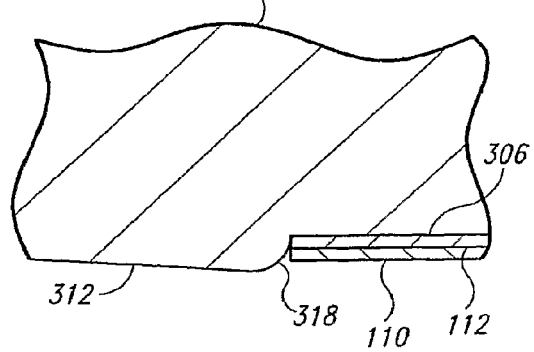

FIGS. 6B to 6E show shoulders used to generate somewhat uniform distributions of residual stresses in the outer bushing 108. The shoulder 318 of FIG. 6B defines an arcuate outer surface 319 extending from the uniform perimeter region 316 to the receiving surface 306. The outer bushing 108 can cam easily over the shoulder 318 and onto the inner bushing 110. FIG. 6C shows a down-tapered shoulder 318. The rate of taper of the shoulder 318 can be increased or decreased to decrease or increase the distance between the inner member 110 and the uniform perimeter region 316. The shape, size, and position of the shoulder 318 can be selected based on the desired interaction between the mandrel 301 and the outer bushing 108. FIG. 6D shows the shoulder 318 comprising a plurality of steps from the uniform perimeter region 316 to the receiving surface 306. FIG. 6E shows the shoulder 318 connecting the maximum perimeter portion 312 to the receiving surface 306.

The height of the shoulder 318 can be selected based on the configuration of the inner member 110 and the installation process. FIG. 6A shows the shoulder 318 with a height H that is generally equal to the wall thickness T of the inner member 110. In some embodiments, the wall thickness T of the inner member 110, including the engagement portion 112, is less than the height H of the shoulder 318 of the mandrel 301. In some embodiments, at least a portion of the wall thickness T of the inner member 110 is greater than or equal to the height H of the shoulder 318 of the mandrel 301. As will be further detailed below, these relative sizes permit the inner member 110 to be slid into the radially-expanded outer bushing 108 during installation without appreciably altering the inner surface 114 of the outer bushing 108.

Figure 5A:
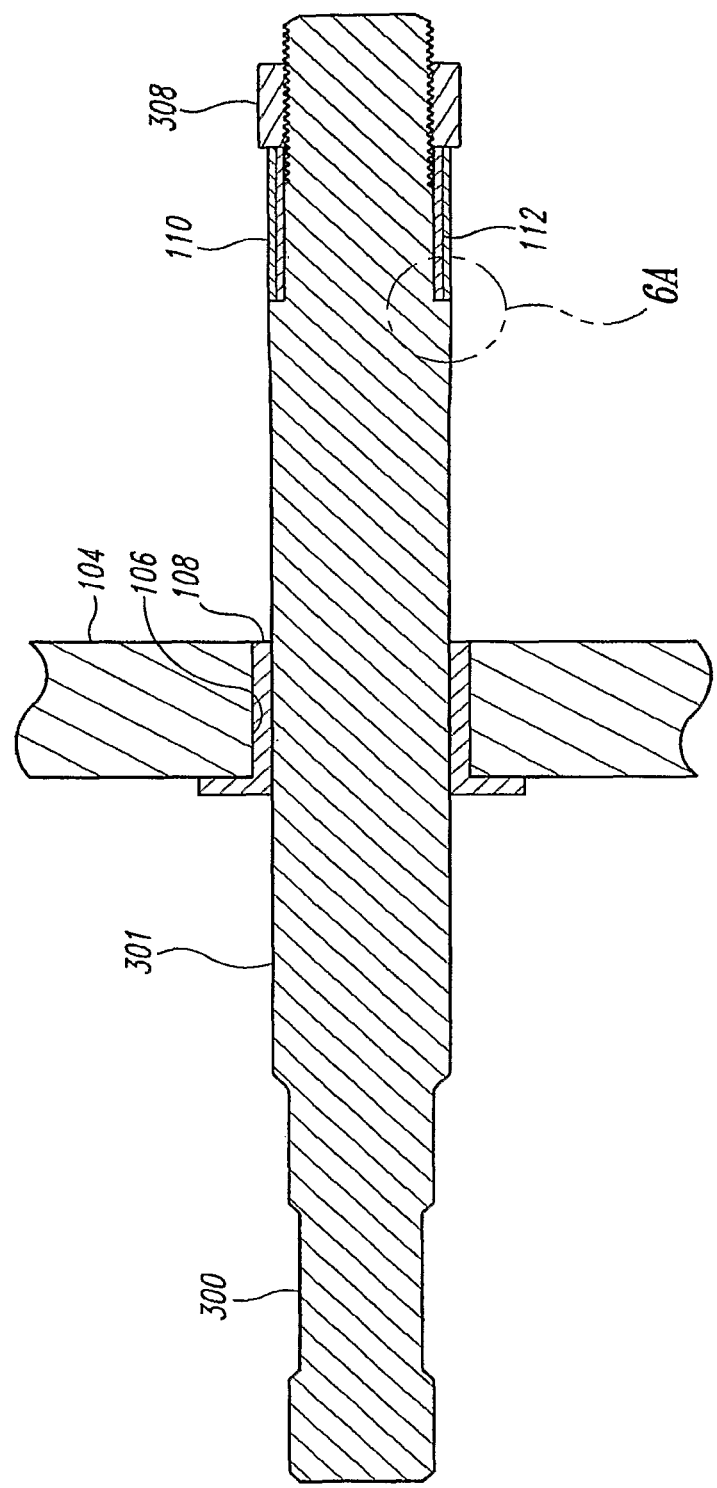
FIG. 5A is a cross-sectional view of the mandrel of FIG. 4A operating to install the bushing kit of FIG. 2 into an opening of a structural workpiece.

Referring to FIGS. 4A and 4B, the collar 308 is positioned downstream from the receiving surface 306 and engages the mandrel 301 to position the inner member 110 during the installation process. The receiving surface 306 is interposed between the shoulder 318 and the collar 308. As shown in the embodiment of FIG. 5A, the collar 308 can serve as a stop to position the inner member 110 at least proximate to the shoulder 318 of the mandrel 301.

The illustrated collar 308 includes internal threads that engage a threaded region 320 of the mandrel 301. The collar 308 can be rotated about the threaded region 320 to adjust the distance between the shoulder 318 and the face 309 (FIG. 4A) of the collar 308 for contacting the inner member 110. The collar 308, once placed on the mandrel 301, may be torqued down to provide at least a slight compression force on the inner member 110 depending on the compressive strength capacity of the inner member 110. In this manner, the collar 308 and shoulder 318 cooperate to limit or substantially prevent axial movement of the inner member 110 along the mandrel 301.

The collar 308 of FIG. 4A can have an outer perimeter 321 that is less than the outer perimeter 122 of the outer bushing 108 such that the collar 308 can be inserted into and through the opening 106 in the workpiece 104 for one-side (e.g., blind-side) processing. After the bushing kit 102 is installed, the collar 308 can be separated from the threaded region 320 to remove a mandrel main body 323 of the mandrel 301 from the kit 102.

Method(s) for Installing at Least One Type of a Bushing Kit

FIG. 5A shows the outer bushing 108 placed in the opening 106 of the structural workpiece 104. The outer bushing 108 is in an initial configuration with the inner perimeter 120 less than outer perimeter 128 of the inner member 110 that is supported on the receiving surface 306 and just about to be pulled into the outer bushing 108. The inner perimeter of the inner member 110 can be sized to be loosely received on the receiving surface 306 to limit or substantially prevent damage to any coating, plating, and/or liner that forms or comprises the inner surface 126 of the inner member 110.

FIG. 5B shows the outer bushing 108 being radially expanded by the mandrel 301 and the inner member 110 about to be inserted into the radially expanded outer bushing 108. The mandrel 301 is pulled through the workpiece (as indicated by the arrow 331) to expand the outer bushing 108 from the initial configuration (see FIG. 5A) with the tapered section 304. The outer perimeter 128 of the inner member 110 can be equal to or less than the maximum perimeter portion 312 of the tapered region 304 of the mandrel 301. This allows the inner member 110 to be inserted into the outer bushing 108 with at least a slight clearance fit.

FIG. 6A shows a detailed view of a region of the mandrel 301, which is approximately defined by the intersection of the tapered region 304, the receiving surface 306, and the shoulder 318, with the inner member 110 positioned on the receiving surface 306. The wall thickness T of the inner member 110 is selected to be approximately equivalent to or smaller than the height H of the shoulder 318 of the mandrel 301, which advantageously permits the inner member 110 to be passed into the radially-expanded outer bushing 108 with at least a minimal amount of clearance between the inner surface 114 of the outer bushing 108 and the outer surface 124 of the inner member 110. In one embodiment, the transition from the maximum perimeter portion 312 and/or the uniform perimeter region 316 of the mandrel 301 to the outer surface 124 of the inner member 110 is a very small step and barely discernable.

The bushing kit 102, which may include the outer bushing 108 and the inner member 110 according to one embodiment, is installed through two distinct yet interdependent actions. These actions are carried out in succession and through a pulling or pushing action of the mandrel 301. Reference herein has been made to "pulling" the mandrel 301, however it is appreciated that the mandrel 301 may also be pushed through the structural workpiece 104. The two distinct yet interdependent actions, are as follows: (1) radially cold expanding the outer bushing 108 into the opening 106 of the structural workpiece 104; and (2) pulling the inner member 110 into the radially-expanded outer bushing 108, where the inner member 110 is pre-positioned on the mandrel 301 to closely follow a maximum cold expansion portion of the mandrel 301, which has been otherwise referred to as the maximum perimeter portion 312 and/or the uniform perimeter region 316 of the mandrel 301.

By locating the inner member 110 on the mandrel 301, as previously described, the inner member 110 can be pulled or pushed into the outer bushing 108 before the outer bushing 108 has had an opportunity to elastically, radially spring back or contract from its radially expanded state. Hence, as the radially-expanded outer bushing 108 does begin to elastically, radially spring back or contract, the radial spring back brings the outer bushing 108 into contact with the inner member 110 to form a secure interference fit therewith.

These distinct yet successive actions may achieve at least two advantages, which were briefly summarized above. The first advantage is that an amount of residual compressive stress is induced into the structural workpiece 104 by the radial expansion of the outer bushing 108. The residual compressive stress may enhance the fatigue life of the structural workpiece 104. The second advantage is that a tight interference fit between the inner member 110 and the outer bushing 108 can be achieved without damaging or altering the integrity of the inner surfaces of either of the respective inner or outer bushings 110, 108. Further, additional or alternative advantages may be achieved as will be apparent to those skilled in the art after reviewing other aspects of the description, claims, and/or figures.

Figure 7:
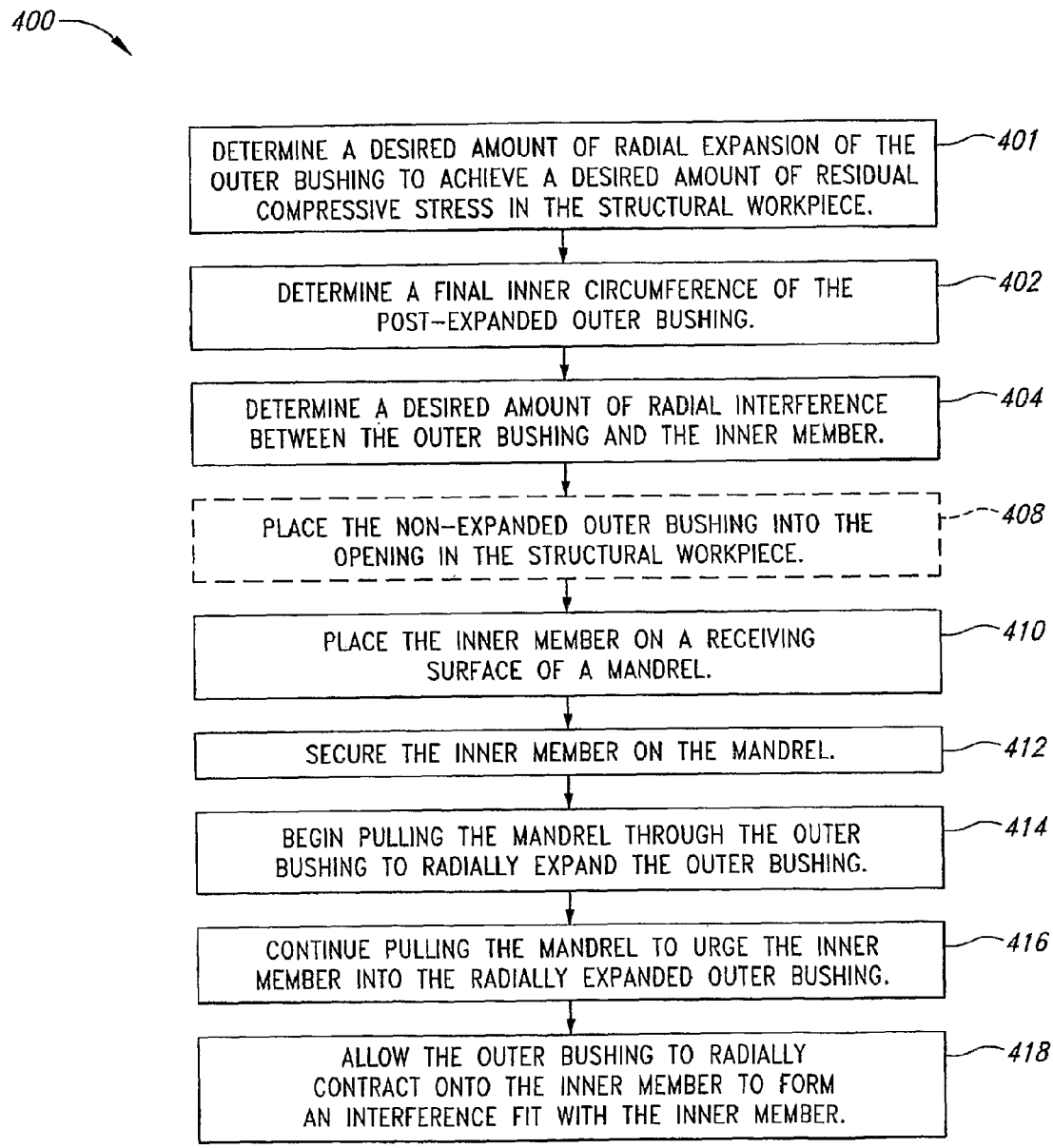
FIG. 7 is a flow chart describing one method of installing a bushing kit into an opening of a structural workpiece, according to one embodiment.

FIG. 7 illustrates a method 400 of installing at least one type of bushing kit into a structural workpiece, according to one embodiment. For discussion and exemplary purposes, the bushing kit comprises an inner member and an outer bushing. It is appreciated that the bushing kit may take other forms, such as the outer bushing and spherical bearing combination described above and illustrated FIG. 3.

At 401, an amount of radial expansion of the outer bushing is selected to achieve a corresponding amount of residual compressive stress in the structural workpiece surrounding the outer bushing. Determining the desired amount of residual compressive stress in the structural workpiece and the amount of interference fit between the inner and outer bushings may be an iterative process to achieve specific design goals, for example installing the bushing kit into a reinforced composite structural workpiece. This iterative process may involve varying or altering one or more of the components (i.e., the structural workpiece, the inner, and/or the outer bushing) and/or various installation parameters in one or more of the following ways, for example, the material properties, the mandrel pulling force, the component dimensions (e.g., wall thickness), the type of coating, plating, or liner, etc. The effect of the wall thickness of one or both of the inner and/or outer bushings, accordingly, is discussed below with respect to the graphs presented in FIGS. 8 and 9.

At 402, a final inner perimeter of the post-expanded outer bushing is pre-determined from testing, closed form solutions, analysis (e.g., numerical analysis), mathematical or computer models, FEA simulations, and the like. The testing and/or analysis is conducted to determine how much elastic spring back versus plastic deformation occurs during the process of radially expanding the outer bushing. The testing and/or analysis may, among other things, be conducted to obtain empirical data and/or to account for various dynamic and/or nonlinear aspects of the assembly or installation, for example aspects such as the constituent material properties, installation temperatures, mandrel pulling forces, dimensional effects (i.e., a thick versus a thin structural workpiece), etc.

By knowing the final inner perimeter dimension or dimensions of the post-expanded outer bushing, a desired amount of radial interference between the non-expanded outer bushing and the inner member may be selected at 404. The term "radial interference" is used herein for clarity and brevity, but it is understood that the bushings and/or the opening in the structural workpiece may be non-circular such that the amount of interference may need to be expressed with alternate language. It is generally understood that when components are assembled with an "interference fit," a contact pressure is present between the components after assembly.

If not already present, the non-expanded outer bushing can be placed in the opening of the structural workpiece at 408. At 410 and 412, the inner member is placed onto the receiving surface of the mandrel and secured onto the mandrel with the nut or collar. At 414, a force is applied to the mandrel, for example a pulling or pushing force, to longitudinally and/or axially advance the mandrel through the inner bushing, causing the tapered region of the mandrel to radially expand the outer bushing to achieve the desired amount of residual compressive stress in the structural workpiece surrounding the outer bushing.

At 416, the maximum cold working portion of the mandrel is moved through the outer bushing as the collar urges the inner member into the radially expanded outer bushing. At 418, the outer bushing elastically, radially contracts to form an interference fit with the inner member. When the mandrel is removed from the inner member, the bushing kit is securely installed in the structural workpiece and the inner surface of the inner member is unaltered from the installation process.

Exemplary Embodiments of Tailored Installations

Figure 8:
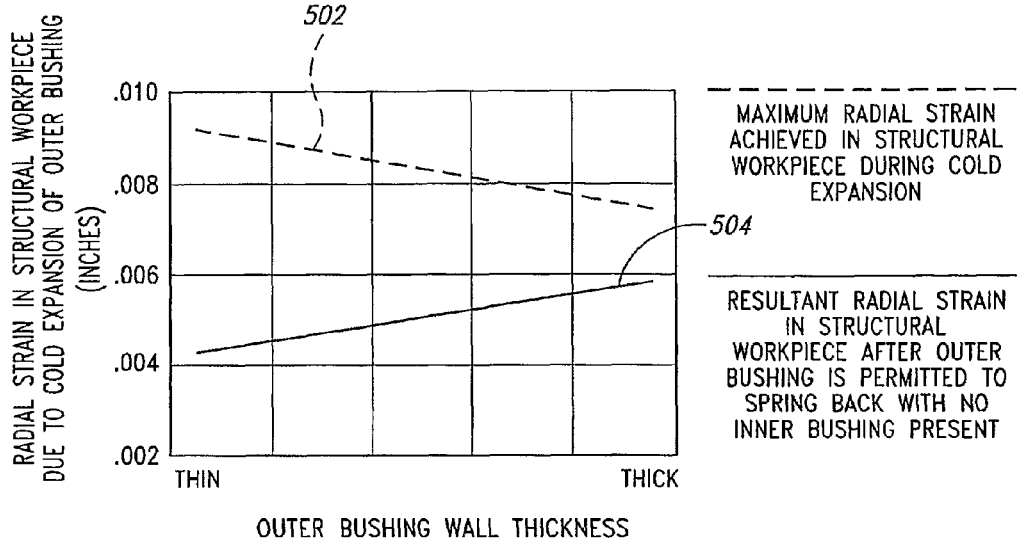
FIG. 8 is a graph showing radial strain in the structural workpiece due to cold expansion of the outer bushing, without an inner bushing installed.
Figure 9:
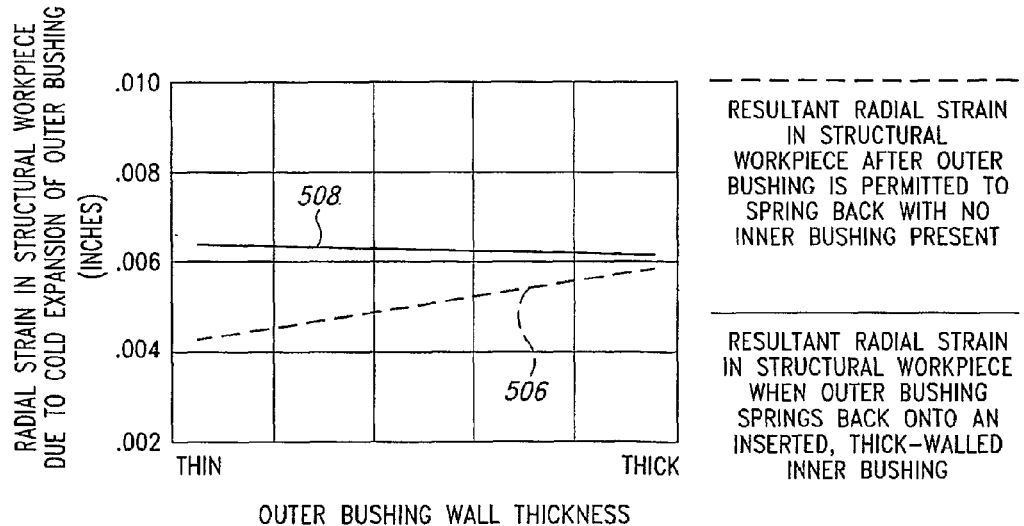
FIG. 9 is a graph showing radial strain in the structural workpiece due to cold expansion of the outer bushing before and after a thick-walled inner bushing has been installed.

FIGS. 8 and 9 show examples of various "tailored" residual stress or strain states in the final installation. Varying the wall thickness between the inner and/or outer bushings as well as the respective material properties, level of expansion, and other processing criteria of the installable members allows for "tailoring" of the residual stress or strain state in the structural workpiece.

FIG. 8 is a graph that shows that radially expanding a thinner-walled outer bushing, in contrast to a thicker-walled outer bushing, may result in a higher amount of radial strain in the structural workpiece during the expansion process combined with a higher amount of elastic spring-back of the outer bushing after expansion. Note that the graph of FIG. 8 illustrates the effect of radially expanding the outer bushing without any influence from an inner bushing. Curve 502 of FIG. 8 shows the amount of radial strain in the structural workpiece during cold expansion of the outer bushing. Curve 504 shows that the amount of radial strain in the structural workpiece is reduced after the thinner-walled outer bushing has had an opportunity to rebound or spring back.

FIG. 9 is a graph that shows the radial strain in the structural workpiece with the installation of both an outer and an inner bushing as compared to the installation of the outer bushing only. Curve 506 of FIG. 9 is the same as curve 504 of FIG. 8 and shows the resultant radial strain in the structural workpiece if the outer bushing is permitted to spring back without an inner bushing present. Curve 508 of FIG. 9 shows that the presence of a thick-walled inner bushing within the outer bushing reduces the amount of spring back of the outer bushing, thus maintaining a higher amount of radial strain in the structural workpiece. In sum, the graph of FIG. 9 shows that the thicker walled inner bushing is better able to react to the contact pressure of the outer bushing, and in turn essentially prop the outer bushing in the opening of the structural workpiece to maintain a higher amount of radial strain in the structural workpiece. Additionally, a high interference can be achieved-without over-expanding the outer bushing 108. The high interference can increase the pullout forces required to remove the assembled outer bushing 108 and inner bushing 110.

In the preceding examples, the fatigue life enhancement is accomplished by the radial strain induced in the structural workpiece. In addition, the amount of spring-back of the outer bushing in addition to the relative sizing of the inner and outer bushings, provides the interference fit between the inner and outer bushings. In one embodiment, the desired amount of interference is sufficient to keep the inner bushing from migrating under operation, vibration, and/or other types of loads.

Advantages of the Bushing Kit and the Method of Installing the Bushing Kit

One advantage of the bushing kits and methods of installation thereof is that the contemporaneous radial expansion of the outer member followed by the insertion of the inner member into the outer member and then followed by at least some amount of radial contraction of the outer member onto the inner member results in secure joint that provides increased resistance to push-out and migration of the members when compared to conventional shrink-fit or press-fit methods. Further, the installation can be accomplished with both the inner and outer members at substantially the same temperature. In some embodiments, the average temperature of the inner member can be less than about 10 degrees Celsius of the average temperature of outer member. In some embodiments, for example, the average temperature of the inner member can be less than 5 degrees Celsius of the average temperature of outer member. This eliminates the need to freeze or heat one of the respective members, which reduces manufacturing time and costs. Thermal processes can often lead to the formation of a condensate, which in turn leads to corrosion. Thus, the installation of the bushing kits can results in reduced condensation and corrosion as compared to installation processes requiring thermal processing.

In addition, the bushing kits may be advantageously installed with special coatings, platings, and/or liners, where these coatings, platings, and/or liners are not subjected to damage during the installation process. Special liners have previously been incompatible with cold-expansion installations due to the inability of the special liners to handle the extreme stresses inherent during a "mandrelized" radial-expansion process. The described methods of installing such bushing kits are quicker, less expensive, and provide a more robust and secure installation than conventional methods.

The cold expansion of the outer member may impart beneficial residual compressive stress in the surrounding base material (i.e., the structural workpiece) to extend the fatigue life and damage tolerance of the structural workpiece, specifically when the structural workpiece experiences tension loading.

Another possible advantage is that the configuration of the final installation may be tailored to achieve a desired amount of residual stress in the structural workpiece while also achieving a desired amount of interference between the inner and outer members. Thus, the bushing kits and/or installation methods may accommodate use in metallic or composite structural workpieces.

Further, the installation of the separate outer bushing and inner member may be advantageous during a rework situation where the inner member containing the liner needs to be replaced, especially in the field. The inner member can be removed while the outer bushing is kept secure in the structural workpiece to preclude damage to the structural workpiece. By way of example, an inner-liner bushing may be installed and removed and then re-installed in a composite structural workpiece while keeping the outer bushing in place so that the laminates of a composite structural workpiece are not disturbed or damaged (e.g., delamination).

Installing bushings into composite materials is a well-known problem because it is difficult to shrink fit into place due to the concern of causing delamination of the composite structural workpiece. The bushing kits and methods generally described herein may preclude such damage by initially installing a lightly radially-expanded outer bushing, which is concurrently followed by an inner member. In such an installation, the ratio of bushing wall thickness could be varied to optimize the overall installation.

Additional and Alternate Embodiments

The bushing kits and installation process may be optimized by varying the relative thickness ratio of the inner and outer bushings. For example, it may be desirable to obtain a higher level of expansion of a thinner outer bushing for the benefit of inducing a higher level of residual stress into the structural workpiece. Relatively large strains can be generated in the material of the workpiece surrounding the outer bushing. In turn this would also allow the outer bushing to "spring-back" by a greater amount and increase the relative interference between the inner and outer bushings. The size and properties (e.g., compressibility) of the inner bushing can be selected for a desired amount of spring back, interference, and final tolerances of the installation.

The bushing kits can produce a wide range of fits, including high interference fits to low interference fits. A high interference bushing kit, for example, can be configured for a high level of retention to, for example, reduce, limit, or substantially prevent migration of one or more of the installed bushings. A relatively thick inner member can be placed into an outer bushing to prop open the outer bushing and control spring back of the outer bushing. The amount of spring back of the outer bushing can be reduced to increase the interference between the outer bushing and the workpiece. In some embodiments, the inner bushing is a stout, thick-walled member that rigidly supports the outer bushing. The outer bushing tends to spring-back from its maximum expanded configuration during the expansion process to an unrestrained configuration (that is, the configuration of the outer bushing if the inner member is not present). The maximum expanded configuration and unrestrained configuration of the outer bushing define a maximum spring-back distance of the outer bushing. The inner bushing can limit spring back of the outer member to less than about 5%, 10%, 20%, 30%, or 40% of the maximum spring back distance. Thus, extremely high interferences can be obtained. Other amounts of spring back are also possible.

The stout inner bushing can have a wall thickness that is substantially greater than the wall thickness of the outer bushing. Additionally or alternatively, the inner bushing can be made of a rigid material, for example, materials with a high modulus of elasticity. The inner bushing can maintain its shape throughout and after the installation process to ensure that proper tolerances are achieved.

A low interference bushing kit, when installed, can have a sufficient amount of interference to limit or substantially prevent unwanted migration with respect to the workpiece, while keeping strains in the workpiece at or below an acceptable level. A workpiece in which the bushing kit is installed may be damaged when subjected to high strains.

The workpiece 104 of FIG. 1, for example, may comprise a composite material that is susceptible to damage due to high strains. The composite material can include, without limitation, reinforcing elements (e.g., fibers, particles, and the like), fillers, binders, matrix, and the like. Wood, fiberglass, polymers, plastics, metals, ceramics, glass, and the like can be combined to produce a workpiece 104 with properties that are different from the properties of its constituents individually. In some embodiments, the workpiece 104 can comprise a fiber-reinforced composite, particle-reinforced composite, laminate (e.g., a stack of laminas), or combinations thereof. The matrix of the reinforced composites can be made of metal, polymers, ceramics, and other suitable materials for encapsulating other reinforcement features. The laminates can be unidirectional laminates, cross-ply laminates, angle-ply laminates, symmetric laminates, and the like.

The bushing kit can be installed in the opening of the composite workpiece, or other type of low strain workpiece, while maintaining the integrity of the workpiece. The outer bushing 108, for example, can be easily inserted into the opening 106. The mandrel 301 can expand the outer bushing 108 to form an interference fit with the workpiece 104. To minimize, limit, or substantially prevent damage to the material surrounding the opening 106, the amount of radial expansion can be below a threshold amount of expansion that would cause unwanted damage to the workpiece 104.

Composites may have relatively low strain capabilities as compared to metals. Expansion of the outer bushing 108 can cause compressive loading in the composite material surrounding the opening 106. If the compressive loading is too high, fibers in a fiber-reinforced composite material can buckle, which in turn affects the material's properties. Microbuckling of fibers may significantly reduce the water resistance of the composite material because buckled fibers may cause micro-cracking of the matrix surrounding the fibers. Splitting due to Poisson's ratio effect, matrix yielding, fiber splitting, debonding (e.g., fiber debonding, interlamina debonding, and the like), and other failure modes are often caused by compressive loading or high strains.

Advantageously, the bushing kit 102 can be installed using sufficiently low levels of strain to control the amount of damage, if any, to the workpiece 104. The outer bushing 108, for example, can be installed with a slight interference fit, as well as other types of fits that keep the outer bushing 108 in the opening 106 until the inner member 110 is installed. The outer bushing 108 thus applies outwardly directed compressive forces to the workpiece 104 without compromising the structural integrity of the workpiece 104.

The inner bushing 110 in the form of a low compressibility bushing can be placed into the expanded outer bushing 108. As noted above, the inner bushing 110 can limit spring-back of the outer member 108 to less than about 5%, 10%, 20%, or 30% of the maximum spring back distance. In some embodiments, the inner bushing 110 can support the outer member 108 to produce a slight increase or decrease in the compressive forces applied to the workpiece 104. For example, the compressive forces applied to the workpiece 104, when the inner bushing is installed, can be at least 95%, 90%, 80%, or 70% of the maximum compressive forces applied by the outer bushing 108 to the workpiece 104 when the outer bushing 108 is at its maximum expanded state. In some, the compressive forces applied to the workpiece 104 can be at least 60%, 50%, 40%, or 30% of the maximum compressive forces applied by the outer bushing 108 to the workpiece 104 when the outer bushing 108 is at its maximum expanded state. Other compressive forces are also possible.

Figure 10:
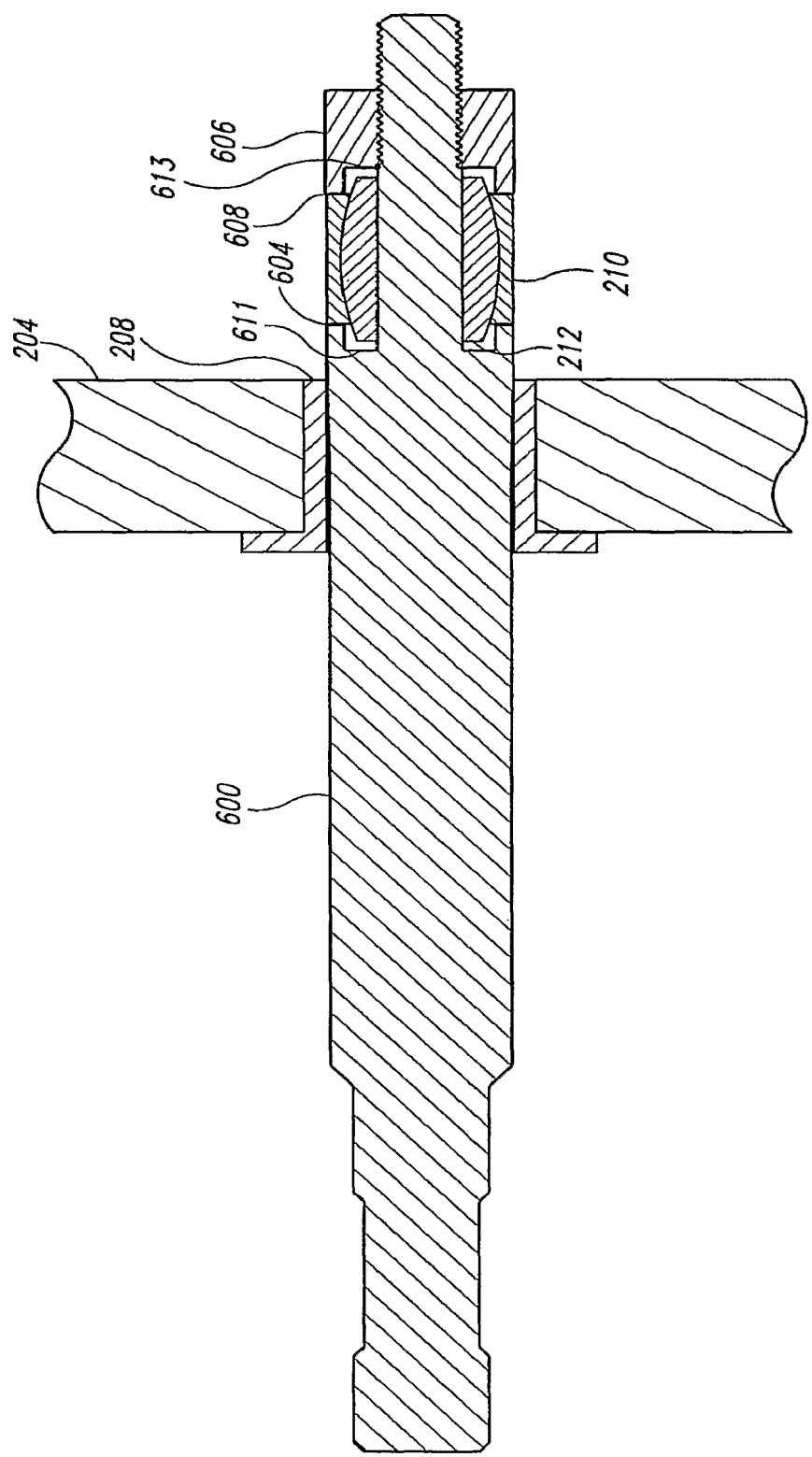
FIG. 10 is a cross-sectional view of a mandrel operating to install the spherical bearing of FIG. 3 into an opening of a structural workpiece, according to another embodiment.

In another embodiment and as shown in FIG. 10, the installation method may be used for installing spherical bearings comprising a race 210 and a ball 212 into an outer bushing 208 and an opening in a structural workpiece 204. FIG. 10 shows a mandrel 600 having a contact portion 604 that cooperates with a portion 608 of a collar or nut 606 to secure the race 210 on the mandrel 600. The mandrel 600 includes a first recess 611 to loosely receive the ball 212 of the spherical bearing while the collar 606 includes a corresponding recess 613 to receive the opposite side of the ball 212. This type of mandrel 600 may allow installation shops and/or repair facilities to easily remove and replace spherical bearings and re-install same-size replacement spherical bearings or oversized spherical bearings, if necessary.

Figure 11:
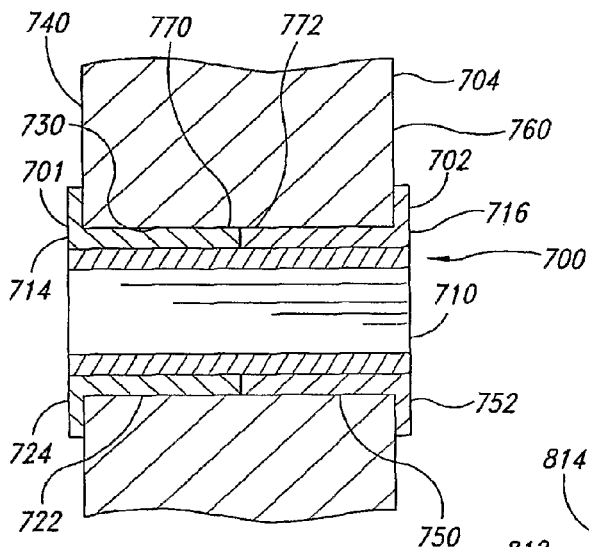
FIGS. 11 to 13 are cross-sectional views of bushing kits, according to other illustrated embodiments.
Figure 12:
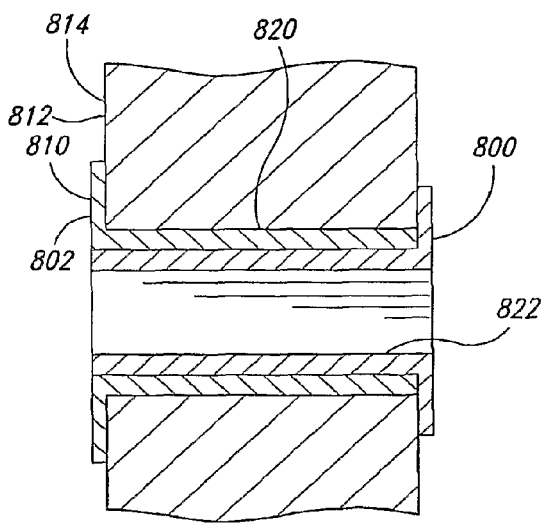
Figure 13:
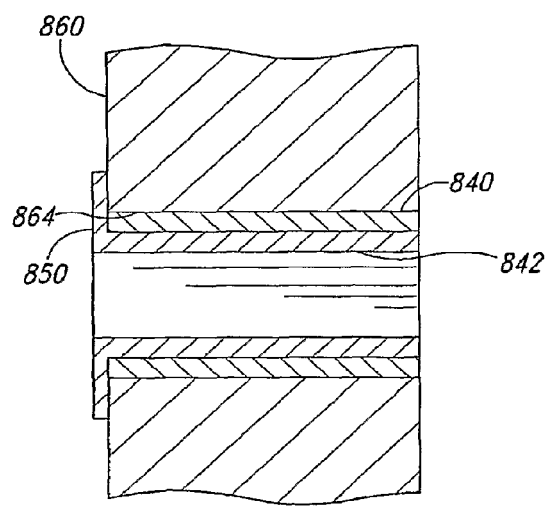

FIGS. 11 to 13 show bushing kits that may be generally similar to the bushing kit 102, except as further detailed below. The bushing kit 700 of FIG. 11 includes a pair of outer bushings 701, 702 sandwiched between a workpiece 704 and an inner member 710. The inner member 710 can extend between opposing ends 714, 716 of the respective outer bushings 701, 702.

The outer bushing 701 includes a tubular section 722 and a radial flange section 724 at one end of the tubular section 722. The tubular section 722 extends axially and has an outer diameter that substantially conforms to an opening 730 in the workpiece 704. The radial flange section 724 extends radially outward and can abut or be adjacent to an outer surface 740 of the workpiece 704.

Similarly, the outer bushings 702 includes a tubular section 750 and a radial flange section 752 at one end of the tubular section 750. The tubular section 750 has an outer diameter that substantially conforms to the opening 730 in the workpiece 704. The radial flange section 752 can abut or be adjacent to the outer surface 760 of the workpiece 704.

The outer bushings 701 on one side of the workpiece 704 can be inserted into and expanded in the opening 730. The outer bushing 702 and inner member 710 on the other side of the workpiece 704 can be installed in a similar manner as the outer bushing 108 and inner member 110 described above. The inner member 710 can be pulled into and through the outer bushings 701, 702 until in the desired position. When assembled, the inner ends 770, 772 of the outer bushings 701, 702 can be position near each other. In some embodiments, the inner end 770 contacts the inner end 772. In other embodiments, the inner end 770 is spaced from, but proximate to, the inner end 772.

FIG. 12 shows a pair of nested bushings 800, 802. The outer bushings 802 includes a radial flange section 810 near or against a first face 812 of a workpiece 814. A tubular section 820 of the outer bushing 802 is interposed between a tubular section 822 of the inner bushing 800 and the workpiece 814.

In some embodiments, the bushing kit may include a third bushing or liner installed with the aforementioned inner and outer bushings. FIG. 13 shows an outer member 840 between a tubular section 842 of an inner bushing 850 and a workpiece 860. The outer member 840 is in the form of a sleeve that extends the length of an opening 864 in the workpiece 860. Another member can be installed into the inner bushing 850 with the mandrels described herein.

In some embodiments, an opening in a work piece may be expanded via a mandrel, and a bushing, bearing or other member inserted before the opening contracts inwardly, creating an interference fit. In some embodiments, an outer race holding a bearing, for example a spherical bearing, may be inserted into a work piece using such an approach.

The various embodiments described above can be combined to provide further embodiments. All of the above U.S. patents, patent applications and publications referred to in this specification as well as U.S. Pat. Nos. 3,566,662; 3,892, 121; 4,187,708; 4,423,619; 4,425,780; 4,471,643; 4,524,600; 4,557,033; 4,809,420; 4,885,829; 4,934,170; 5,083,363; 5,096,349; 5,405,228; 5,245,743; 5,103,548; 5,127,254; 5,305,627; 5,341,559; 5,380,136; 5,433,100; and in U.S. patent application Ser. Nos. 09/603,857; 10/726,809; 10/619, 226; and 10/633,294 are incorporated herein by reference. Aspects can be modified, if necessary or desired, to employ devices, features, elements (e.g., fasteners, bushings, and other types of expandable members), and concepts of the various patents, applications, and publications to provide yet further embodiments. For example, the mandrel 301 of FIG. 4A can be used to installed two or more expandable members disclosed in the incorporated patents, applications, and publications.

These and other changes can be made in light of the above detailed description. In general, in the following claims, the terms used should not be construed to limit the invention to the specific embodiments disclosed in the specification and the claims, but should be construed to include all types of bushing kits and/or other assemblies that are installable in an opening of a structural workpiece and that operate in accordance with the claims. Accordingly, the invention is not limited by the disclosure, but instead its scope is to be determined entirely by the following claims.

What is claimed is:

1. A bushing installation comprising:
a workpiece having an opening, the workpiece including residual compressive stresses in a portion of the workpiece surrounding the opening;
an outer member in an installed, radially expanded configuration positioned in the opening, the outer member having an inner surface and an outer surface, the inner surface having an inner perimeter and defining a passageway, the outer surface having an outer perimeter forming an interference fit with the workpiece; and
an inner member positioned in the passageway of the outer member, the inner member having an outer surface forming an interference fit with the inner surface of the outer member, the inner member both supporting and limiting radial contraction of the outer member from the installed, radially expanded configuration, the inner member including an inner surface that defines a passageway through the inner member, the inner surface including a coating, plating, or lining that is unaltered from the installation of the inner member and the outer member in the workpiece,
wherein the outer member is configured to elastically contract from an intermediate, radially expanded configuration to the installed, radially expanded configuration so as to form the interference fit between the outer member and the inner member.

2. The bushing installation of claim 1 wherein the workpiece comprises a composite material surrounding the opening.

3. The bushing installation of claim 2 wherein the composite material is a fiber reinforced composite.

4. The bushing installation of claim 1 wherein the outer member in the installed, radially expanded configuration applies a compressive force that is at least about 70% of a compressive force applied to the workpiece by the outer member when in the intermediate, radially expanded configuration.

5. The bushing installation of claim 1 wherein the residual compressive stresses in the workpiece are sufficient to improve fatigue performance of the workpiece.

6. The bushing installation of claim 1 wherein the coating, plating, or lining has a material hardness that is lower than the inner surface of the inner member.

7. The bushing installation of claim 6 wherein the coating, plating, or lining forms a layer of a wear resistant material on the inner surface of the inner member.

* * * * *

UNITED STATES PATENT AND TRADEMARK OFFICE
CERTIFICATE OF CORRECTION

| | | |
|---|---|---|
| PATENT NO. | : 8,568,034 B2 | Page 1 of 1 |
| APPLICATION NO. | : 12/158943 | |
| DATED | : October 29, 2013 | |
| INVENTOR(S) | : Johnson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1073 days.

Signed and Sealed this
Seventeenth Day of February, 2015

Michelle K. Lee
*Deputy Director of the United States Patent and Trademark Office*